United States Patent
Gabriele et al.

(10) Patent No.: US 11,089,461 B2
(45) Date of Patent: Aug. 10, 2021

(54) SYSTEM AND METHOD FOR VARYING A FUNCTION TRIGGERED BY NEAR FIELD COMMUNICATION

(71) Applicant: Capital One Services, LLC, McLean, VA (US)

(72) Inventors: David Gabriele, Boston, MA (US); Wayne Lutz, Fort Washington, MD (US); Lin Ni Lisa Cheng, Fresh Meadows, NY (US); Daniel John Marsch, Arlington, VA (US); Tyler Maiman, Melville, NY (US); Saleem Ahmed Sangi, McLean, VA (US); Kevin Osborn, Newton Highlands, MA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/428,579

(22) Filed: May 31, 2019

(65) Prior Publication Data

US 2019/0373433 A1    Dec. 5, 2019

Related U.S. Application Data

(60) Provisional application No. 62/679,571, filed on Jun. 1, 2018.

(51) Int. Cl.
*H04W 4/80* (2018.01)
*G01S 1/68* (2006.01)
(Continued)

(52) U.S. Cl.
CPC ............... *H04W 4/80* (2018.02); *G01S 1/68* (2013.01); *G06Q 20/3278* (2013.01);
(Continued)

(58) Field of Classification Search
None
See application file for complete search history.

(56) References Cited

U.S. PATENT DOCUMENTS 7,079,008 B2    7/2006   Castle et al.
7,423,525 B2    9/2008   Bandy
(Continued)

OTHER PUBLICATIONS

Notification of Transmittal of the International Search Report and the Written Opinion of the International Searching Authority from Application No. PCT/US2019/034851 dated Aug. 16, 2019.
(Continued)

*Primary Examiner* — Jacob C. Coppola
*Assistant Examiner* — Jason B Fenstermacher
(74) *Attorney, Agent, or Firm* — Hunton Andrews Kurth LLP

(57) ABSTRACT

An automated method is provided for initiating a transaction function in a transaction processing device. The method comprises establishing near field communication between the transaction processing device and an NFC transmitting device having an associated tag identifier and receiving NFC information including the tag identifier. The transaction processing device transmits the NFC information to a merchant processor and receives from the merchant processor a tag rule communication including an instruction to carry out a transaction function associated with the tag identifier or a request to associate a new transaction function with the tag identifier. Responsive to receiving an instruction to carry out a transaction function associated with the tag identifier, the transaction processing device executes the transaction function. Responsive to receiving a request to associate a new transaction function with the tag identifier, the transaction processing device transmits a request response to the merchant processor.

16 Claims, 12 Drawing Sheets

(51) Int. Cl.
| | |
|---|---|
| *H04W 4/029* | (2018.01) |
| *H04B 17/318* | (2015.01) |
| *H04W 52/02* | (2009.01) |
| *H04W 64/00* | (2009.01) |
| *G06Q 20/32* | (2012.01) |
| *H04L 29/08* | (2006.01) |
| *H04W 24/08* | (2009.01) |
| *H04W 76/10* | (2018.01) |
| *G06F 3/01* | (2006.01) |
| *G06F 3/14* | (2006.01) |

(52) U.S. Cl.
CPC ......... *H04B 17/318* (2015.01); *H04L 67/141* (2013.01); *H04W 4/029* (2018.02); *H04W 24/08* (2013.01); *H04W 52/0229* (2013.01); *H04W 52/0245* (2013.01); *H04W 64/003* (2013.01); *G06F 3/017* (2013.01); *G06F 3/14* (2013.01); *H04W 76/10* (2018.02)

(56) References Cited

U.S. PATENT DOCUMENTS

| | | | |
|---|---|---|---|
| 7,474,196 | B2 | 1/2009 | Vesikivi et al. |
| 7,486,171 | B2 | 2/2009 | Kim et al. |
| 7,541,930 | B2 | 6/2009 | Saarisalo et al. |
| 8,214,910 | B1 | 7/2012 | Gossweiler, III et al. |
| 8,281,335 | B2 | 10/2012 | Urdang et al. |
| 8,325,020 | B2 | 12/2012 | Izadi et al. |
| 8,380,246 | B2 | 2/2013 | Wilson et al. |
| 8,612,767 | B2 | 12/2013 | Gossweiler, III et al. |
| 8,618,932 | B2 | 12/2013 | Maia et al. |
| 8,638,190 | B1 | 1/2014 | Want et al. |
| 8,922,348 | B2 | 12/2014 | Leonard et al. |
| 9,021,270 | B1 | 4/2015 | Byers et al. |
| 9,113,235 | B2 | 8/2015 | Choi et al. |
| 9,219,979 | B2 | 12/2015 | Moldaysky et al. |
| 9,460,573 | B1 | 10/2016 | Cordes et al. |
| 9,531,858 | B2 | 12/2016 | Thuroe |
| 9,538,370 | B2 | 1/2017 | Ko et al. |
| 9,564,950 | B2 | 2/2017 | Jin et al. |
| 9,569,163 | B2 | 2/2017 | Gai et al. |
| 9,571,164 | B1* | 2/2017 | Luo .................... H04B 5/0056 |
| 9,571,956 | B2 | 2/2017 | Gai et al. |
| 9,578,481 | B2 | 2/2017 | Gai et al. |
| 9,633,243 | B1 | 4/2017 | Geist et al. |
| 9,641,969 | B2 | 5/2017 | Theurer et al. |
| 2004/0176032 | A1 | 9/2004 | Kotola et al. |
| 2005/0033619 | A1 | 2/2005 | Barnes et al. |
| 2005/0160003 | A1 | 7/2005 | Berardi et al. |
| 2006/0094405 | A1 | 5/2006 | Dupont |
| 2006/0094411 | A1 | 5/2006 | Dupont |
| 2006/0094412 | A1 | 5/2006 | Nonoyama et al. |
| 2006/0293069 | A1 | 12/2006 | Patel et al. |
| 2007/0075133 | A1 | 4/2007 | Yeager |
| 2007/0109103 | A1 | 5/2007 | Jedrey et al. |
| 2008/0030304 | A1 | 2/2008 | Doan et al. |
| 2008/0094217 | A1 | 4/2008 | Okamasu et al. |
| 2008/0191878 | A1 | 8/2008 | Abraham |
| 2009/0036165 | A1 | 2/2009 | Brede |
| 2010/0075601 | A1 | 3/2010 | Yuasa |
| 2010/0090831 | A1 | 4/2010 | Zhao et al. |
| 2010/0156609 | A1 | 6/2010 | Kim et al. |
| 2010/0294835 | A1 | 11/2010 | Bam et al. |
| 2011/0084811 | A1 | 4/2011 | Park et al. |
| 2011/0212687 | A1 | 9/2011 | Foster |
| 2011/0212688 | A1 | 9/2011 | Griffin et al. |
| 2011/0215902 | A1 | 9/2011 | Brown, III et al. |
| 2012/0022930 | A1* | 1/2012 | Brouhard ............ G06Q 30/0229 705/14.22 |
| 2012/0059741 | A1 | 3/2012 | Khan et al. |
| 2012/0075068 | A1 | 3/2012 | Walker et al. |
| 2012/0105200 | A1 | 5/2012 | Yoo et al. |
| 2012/0127976 | A1 | 5/2012 | Lin et al. |
| 2012/0190301 | A1 | 7/2012 | Hart |
| 2012/0223815 | A1 | 9/2012 | Dennard |
| 2012/0316950 | A1 | 12/2012 | Laporte et al. |
| 2013/0002405 | A1 | 1/2013 | Pesonen et al. |
| 2013/0021139 | A1 | 1/2013 | Guo |
| 2013/0065526 | A1* | 3/2013 | Pottier .................... H04L 67/34 455/41.2 |
| 2013/0109369 | A1 | 5/2013 | Forutanpour et al. |
| 2013/0110657 | A1 | 5/2013 | Forster |
| 2013/0166399 | A1 | 6/2013 | Awad |
| 2013/0225079 | A1 | 8/2013 | Ashour et al. |
| 2013/0229265 | A1 | 9/2013 | Sajadi et al. |
| 2013/0237152 | A1 | 9/2013 | Taggar et al. |
| 2013/0244575 | A1 | 9/2013 | Forutanpour et al. |
| 2013/0257804 | A1 | 10/2013 | Vu et al. |
| 2013/0281014 | A1 | 10/2013 | Frankland et al. |
| 2013/0288594 | A1 | 10/2013 | Yeh |
| 2013/0303085 | A1* | 11/2013 | Boucher .................. H04W 4/80 455/41.1 |
| 2013/0309964 | A1 | 11/2013 | Hall et al. |
| 2013/0311313 | A1 | 11/2013 | Laracey |
| 2013/0335201 | A1* | 12/2013 | Kang ................ G06K 7/10366 340/10.5 |
| 2014/0085090 | A1 | 3/2014 | Yeo |
| 2014/0201086 | A1* | 7/2014 | Gadotti ................ G06Q 20/322 705/72 |
| 2014/0203918 | A1 | 7/2014 | Hori |
| 2014/0256249 | A1 | 9/2014 | Tse et al. |
| 2014/0266626 | A1* | 9/2014 | Moulin .................. G06Q 30/00 340/10.1 |
| 2014/0361872 | A1* | 12/2014 | Garcia ................ H04B 5/0062 340/5.74 |
| 2015/0002275 | A1 | 1/2015 | Jantunen et al. |
| 2015/0019432 | A1 | 1/2015 | Burns |
| 2015/0032603 | A1 | 1/2015 | Rutherford |
| 2015/0140982 | A1 | 5/2015 | Postrel |
| 2015/0161641 | A1 | 7/2015 | Barnes et al. |
| 2015/0215737 | A1 | 7/2015 | Shin et al. |
| 2015/0294210 | A1 | 10/2015 | Martinez de Velasco Cortina et al. |
| 2015/0304804 | A1 | 10/2015 | Lotito |
| 2016/0277999 | A1* | 9/2016 | Graves .................... H04L 67/20 |
| 2016/0316317 | A1 | 10/2016 | Mayiras |
| 2016/0360348 | A1 | 12/2016 | Ueda |
| 2016/0379269 | A1 | 12/2016 | Ellis et al. |
| 2017/0006440 | A1 | 1/2017 | Postrel |
| 2017/0017869 | A1* | 1/2017 | Jiang .................. G06F 16/9554 |
| 2017/0071018 | A1 | 3/2017 | Pidhorodetskyi et al. |
| 2017/0091496 | A1 | 3/2017 | Nevarez Pedroza |
| 2017/0236345 | A1 | 8/2017 | Watters |
| 2017/0251334 | A1 | 8/2017 | Bogestam et al. |
| 2017/0308692 | A1 | 10/2017 | Yano |
| 2018/0014187 | A1 | 1/2018 | Chan et al. |
| 2018/0027208 | A1 | 1/2018 | Sardar et al. |
| 2018/0054735 | A1 | 2/2018 | Hart |
| 2019/0068247 | A1 | 2/2019 | Hueber et al. |

OTHER PUBLICATIONS

Notification of Transmittal of the International Search Report and the Written Opinion of the International Searching Authority from Application No. PCT/US2019/034869 dated Aug. 26, 2019.

Notification of Transmittal of the International Search Report and the Written Opinion of the International Searching Authority from related Application No. PCT/US2019/034847 dated Aug. 27, 2019.

* cited by examiner

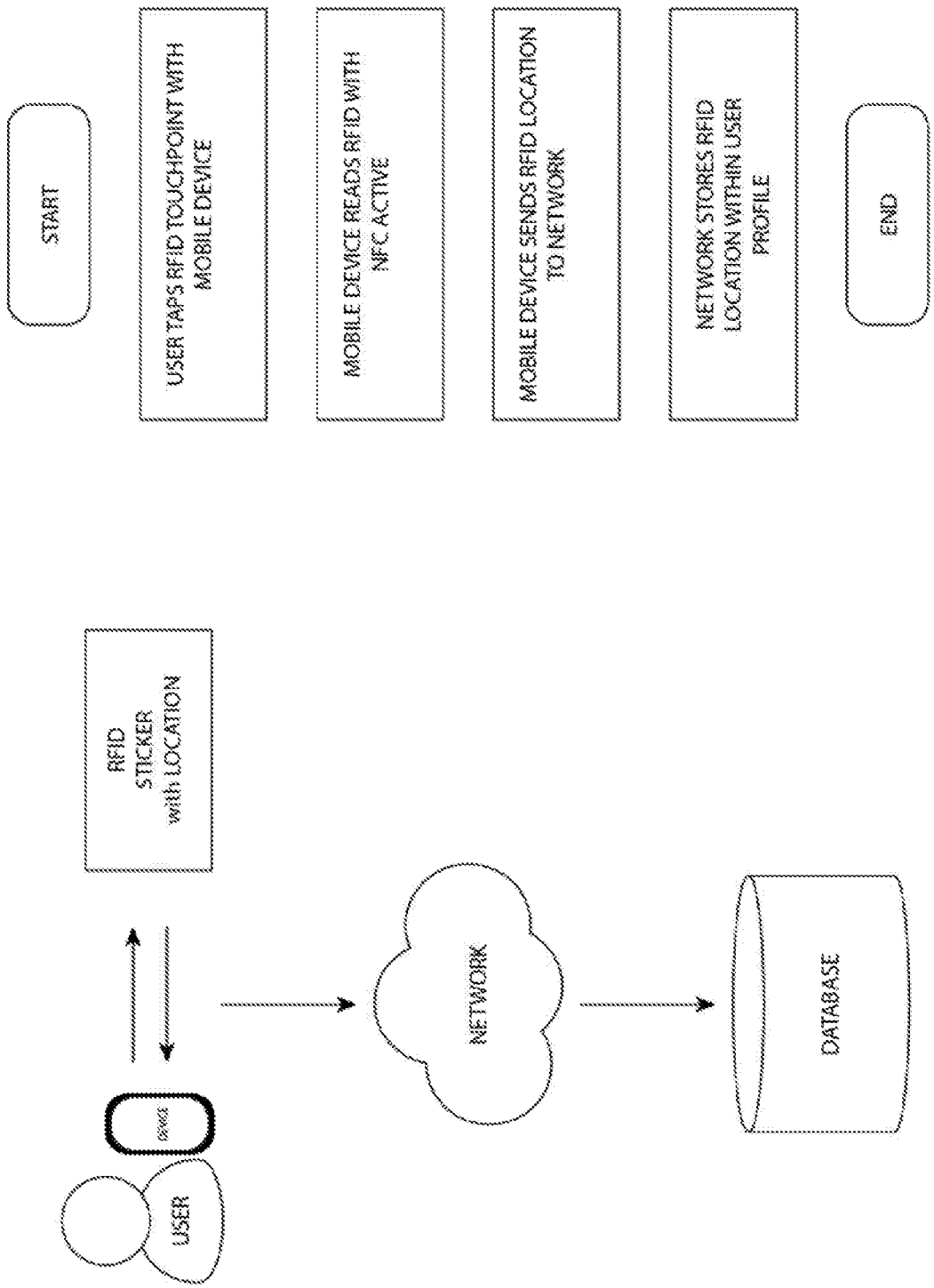

SYSTEM AND METHOD FOR VARYING A FUNCTION TRIGGERED BY NEAR FIELD COMMUNICATION

This application claims priority to U.S. Provisional Patent Application 62/679,571, filed Jun. 1, 2018, the complete disclosure of which is incorporated herein by reference.

FIELD OF THE INVENTION

This application relates generally to communication with contactless interfaces (e.g., radio-frequency identification (RFID) tags and other near field communication (NFC) devices) and device enhancement, and, more particularly, to rules-based activation of a user device function as the result of interaction with an NFC device.

BACKGROUND OF THE INVENTION

In the related art, the functionality of contactless interface points and readers (e.g., RFID and other NFC devices) typically provides for the acquiring of a single source of static information. This static information provision does not provide for nuanced device and function management. Accordingly, there is a need for improved systems and methods to provide enhancements to contactless interface points, contactless interface point functionality, and contactless interface point readers, including user devices. Embodiments of the present disclosure are directed to these and other considerations.

SUMMARY OF THE INVENTION

An illustrative aspect of the invention provides a method of initiating a transaction function in a transaction processing device. The method comprises establishing near field communication between the transaction processing device and an NFC transmitting device having an associated tag identifier and receiving, by the transaction processing device from the NFC transmitting device, NFC information including the tag identifier. The method further comprises transmitting the NFC information by the transaction processing device to a merchant processor via a network. The transaction processing device then receives from the merchant processor, a tag rule communication including one of the set consisting of an instruction to carry out a transaction function associated with the tag identifier and a request to associate a new transaction function with the tag identifier. Responsive to receiving an instruction to carry out a transaction function associated with the tag identifier, the transaction processing device executes the transaction function. Responsive to receiving a request to associate a new transaction function with the tag identifier, the transaction processing device transmits a request response to the merchant processor.

Another aspect of the invention provides an automated method of activating a transaction function in a transaction processing device. The method comprises receiving, by a merchant processor from a transaction processing device over a network, NFC information associated with an NFC transmitting device in NFC communication with the transaction processing device. the method further comprises determining from the NFC information, a tag identifier associated with the NFC transmitting device and determining if the tag identifier is associated with a defined transaction function. Responsive to a determination that the tag identifier is not associated with a defined transaction function, the merchant processor associates a new transaction function with the tag identifier. Responsive to a determination that the tag identifier is associated with a defined transaction function, the merchant server transmits to the transaction processing device an instruction to carry out the defined transaction function.

Another aspect of the invention provides a transaction processing system comprising a plurality of NFC transmitting devices, each having an associated tag identifier and configured to transmit NFC information comprising the tag identifier. The system further comprises a plurality of user interface devices each comprising a data processor, a user interface, a near field communication (NFC) interface, and a memory accessible by the data processor. The memory has stored thereon a transaction application, an NFC application, and a transaction function association application. The transaction application comprises instructions to the data processor for carrying out transactions with transaction processing servers via a first network. The NFC application is configured to establish communication between the data processor and the NFC transmitting devices via the NFC interfaces and to receive NFC information therefrom. The transaction function association application comprises instructions to, upon establishment of communication with one of the NFC transmitting devices, transmit the received NFC information by the transaction processing device via a second network and receive a tag rule communication via the second network. The tag rule communication includes one of the set consisting of an instruction for the transaction application to carry out a transaction function associated with the tag identifier and a request to associate a new transaction function with the tag identifier. The system further comprises an NFC rules database having stored therein a subset of the tag identifiers. Each of the subset of tag identifiers has a transaction function associated with it. The system also comprises a merchant server in communication with the NFC rules database and, via the second network, the plurality of user interface devices. The merchant server is configured to receive NFC information from a requesting user interface device via the second network, determine from the NFC information, a tag identifier associated with an NFC transmitting device, and determine if the tag identifier is one of the subset of the tag identifiers stored in the NFC rules database. The merchant server is further configured so that, responsive to a determination that the tag identifier is not one of the subset of the tag identifiers, the merchant server associates a new transaction function with the tag identifier and stores the tag identifier and associated new transaction function in the NFC rules database. The merchant server is also configured so that, responsive to a determination that the tag identifier is one of the subset of the tag identifiers, the merchant server determines the transaction function associated with the tag identifier and transmits an instruction to the requesting user interface device to carry out the defined transaction function.

BRIEF DESCRIPTION OF THE DRAWINGS

The invention can be more fully understood by reading the following detailed description together with the accompanying drawings, in which like reference indicators are used to designate like elements, and in which:

FIG. 3A illustrates a system environment for implementing certain aspects of the present disclosure;

FIG. 3B is an example flowchart of a method of the present disclosure;

DETAILED DESCRIPTION OF THE INVENTION

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although RFIDs, RFID stickers, RFID devices, RFID kiosks, etc., are generally used herein, these are merely examples. One of ordinary skill will recognize that, in light of the present disclosure, the RFID technology may be substituted or augmented with various types of contactless or wireless technologies. As non-limiting examples, various aspects of the present disclosure may utilize one or more of NFC tags, RFID stickers, and NXP MIFARE stickers, image codes (e.g., one-or two dimensional barcodes or QR codes), as well as interface points for different frequency readers (e.g., readers attuned to non-traditional contactless interface point tunings), and contactless interface points designed for different technologies (e.g., sonic readers or X-ray readers) may be used in addition to or in place of RFID devices.

Figure 1:
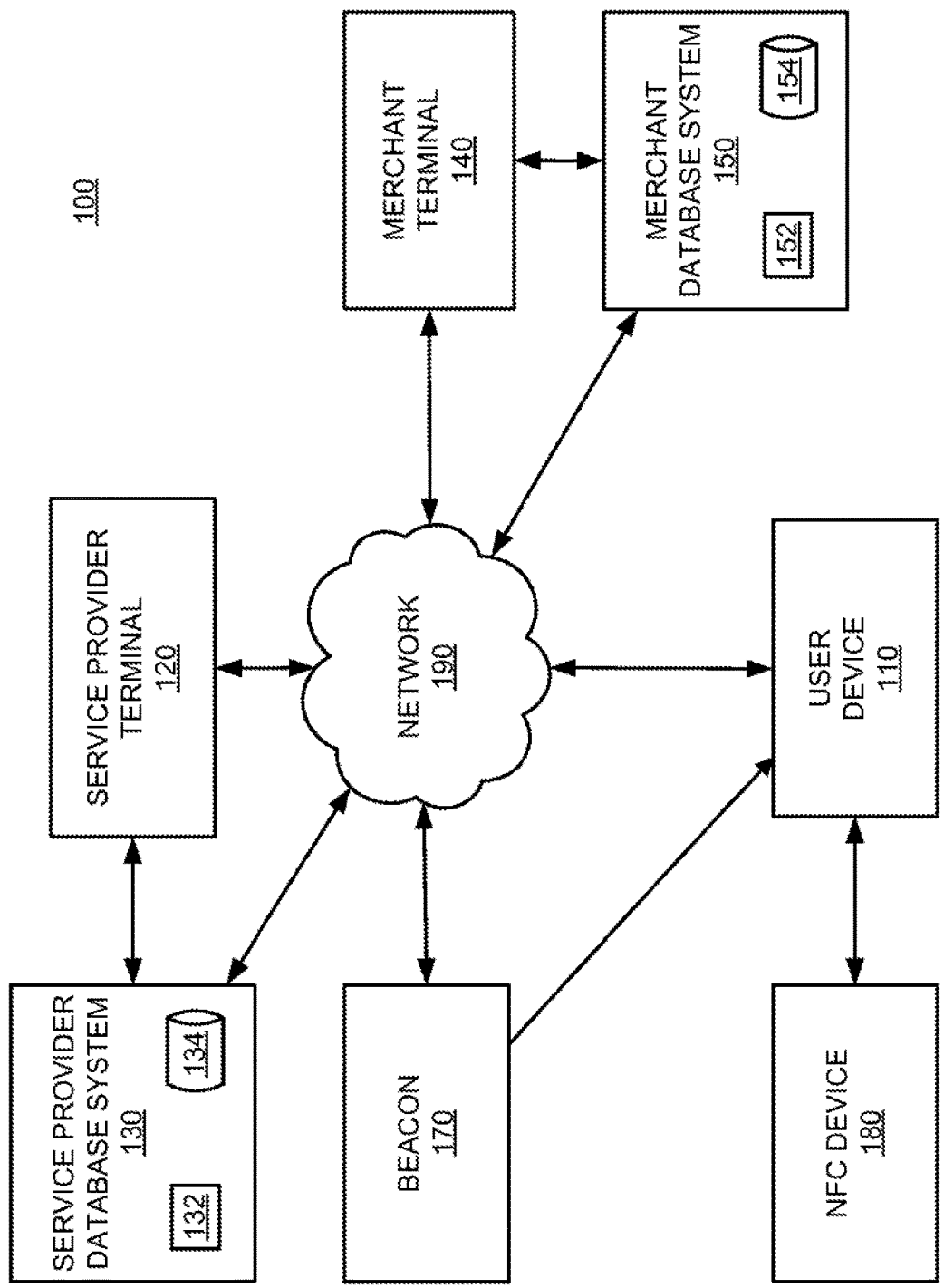
FIG. 1 is an example block diagram representing a system environment that may implement one or more aspects of the present disclosure.

FIG. 1 illustrates a system environment 100 in which one or more aspects of the present disclosure may be implemented. System environment 100 may include one or more of a user device 110, a service provider terminal 120, a service provider database system 130, a merchant terminal 140, a merchant database system 150, a beacon 170, an NFC device 180, and a network 190. In some cases, system environment 100 may include one or more of each of user devices 110, service provider terminals 120, service provider database systems 130, merchant terminals 140, merchant database systems 150, beacons 170, NFC devices 180, and networks 190. A non-limiting example of a computer system architecture that can implement one or more of user device 110, service provider terminal 120, service provider database system 130, merchant terminal 140, merchant database system 150, and beacon 170 will be described below in greater detail with reference to FIG. 9.

User device 110 may include, as non-limiting examples, a mobile interface device (e.g., a smart phone, tablet computer, smart wearable device, portable laptop computer, voice command device, or other mobile computing device) or a stationary computing device (e.g., a stationary desktop or other stationary computer). In some embodiments, user device 110 may be configured to interact with one or more of service provider terminal 120, service provider database system 130, merchant terminal 140, merchant database system 150, beacon 170, and NFC device 180, either directly or over network 190. User device 110 and may be equipped with a display, speakers or other auditory devices, tactile simulators, haptic sensors, cameras, light projectors, input devices, distance measuring equipment, 3D scanners, IR sensors, microphones, orientation/position/location sensors, accelerometers, and other devices.

Figure 2:
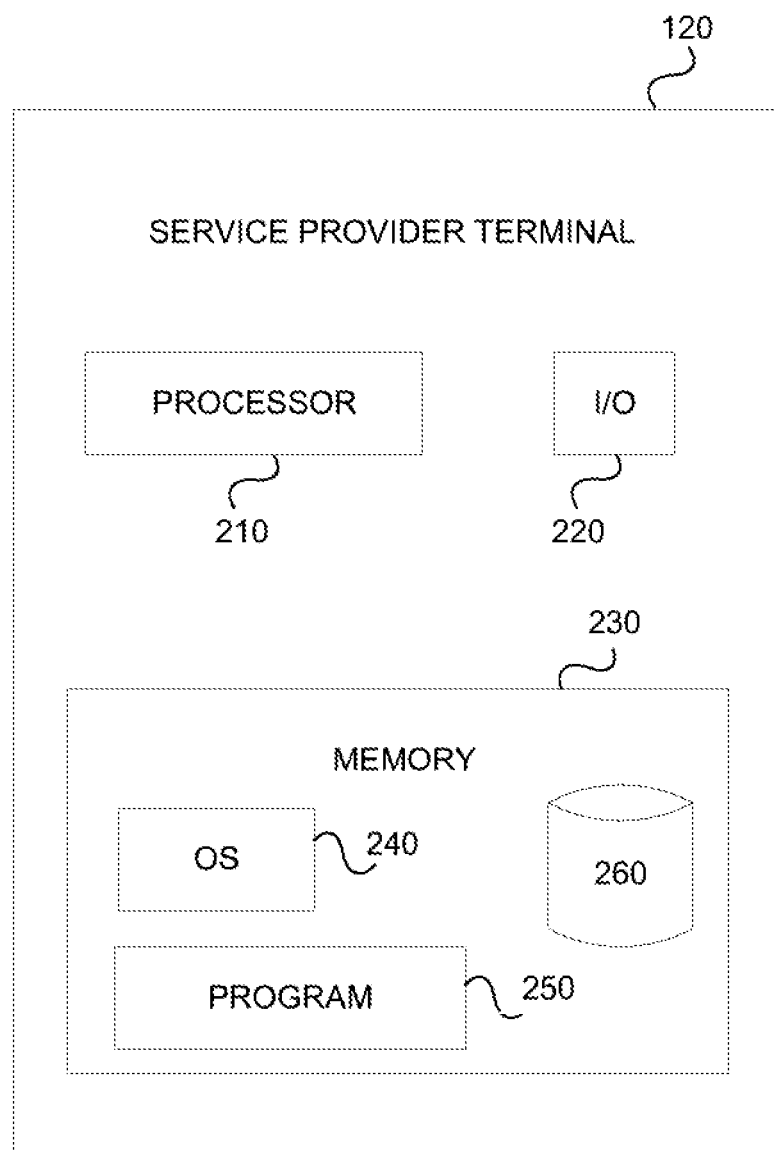
FIG. 2 is a component diagram of an example service provider terminal.

An exemplary embodiment of service provider terminal 120 is shown in more detail in FIG. 2. User device 110, service provider database system 130, merchant terminal 140, merchant database system 150, and beacon 170 may have a similar structure and components that are similar to those described with respect to service provider terminal 120. As shown, service provider terminal 120 may include a processor 210, an input/output ("I/O") device 220, a memory 230 containing an operating system ("OS") 240 and a program 250. For example, service provider terminal 120 may be a single server or may be configured as a distributed computer system including multiple servers or computers that interoperate to perform one or more of the processes and functionalities associated with the disclosed embodiments. In some embodiments, the service provider terminal 120 may further include a peripheral interface, a transceiver, a mobile network interface in communication with the processor 210, a bus configured to facilitate communication between the various components of the service provider terminal 120, and a power source configured to power one or more components of the service provider terminal 120.

A peripheral interface may include the hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with, for example, one or more of: radio-frequency identification (RFID), near-field communication (NFC), Bluetooth™, low-energy Bluetooth™ (BLE), WiFi™, ZigBee™, Z-Wave™, ambient backscatter communications (ABC) protocols or similar technologies.

A mobile network interface may provide access to a cellular network, the Internet, or another wide-area network. In some embodiments, a mobile network interface may include hardware, firmware, and/or software that allows the processor(s) 210 to communicate with other devices via wired or wireless networks, whether local or wide area, private or public, as known in the art. A power source may be configured to provide an appropriate alternating current (AC) or direct current (DC) to power components.

Processor 210 may include one or more of a microprocessor, microcontroller, digital signal processor, co-processor or the like or combinations thereof capable of executing stored instructions and operating upon stored data. Memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 230.

Processor 210 may be one or more known processing devices, such as, but not limited to, a microprocessor from the Pentium™ family manufactured by Intel™ or the Turion™ family manufactured by AMD™. Processor 210 may constitute a single core or multiple core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Service provider terminal 120 may include one or more storage devices configured to store information used by processor 210 (or other components) to perform certain functions related to the disclosed embodiments. In one example, service provider terminal 120 may include memory 230 that includes instructions to enable processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, service provider terminal 120 may include memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, service provider terminal 120 may include memory 230 that may include one or more programs 250 to perform one or more functions of the disclosed embodiments. Moreover, processor 210 may execute one or more programs 250 located remotely from system 100. For example, system 100 may access one or more remote programs 250, that, when executed, perform functions related to disclosed embodiments.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational databases. Memory 230 may include software components that, when executed by processor 210, perform one or more processes consistent with the disclosed embodiments. In some embodiments, memory 230 may include one or more databases 260, for storing related data to enable service provider terminal 120 to perform one or more of the processes and functionalities associated with the disclosed embodiments.

Service provider terminal 120 may also be communicatively connected to one or more memory devices (e.g., databases (not shown)) locally or through a network. The remote memory devices may be configured to store information and may be accessed and/or managed by service provider terminal 120. By way of example, the remote memory devices may be document management systems, Microsoft™ SQL databases, SharePoint™ databases, Oracle™ databases, Sybase™ databases, or other relational databases. Systems and methods consistent with disclosed embodiments, however, are not limited to separate databases or even to the use of a database.

Service provider terminal 120 may also include one or more I/O devices 220 that may comprise one or more interfaces for receiving signals or input from devices and providing signals or output to one or more devices that allow data to be received and/or transmitted by service provider terminal 120. For example, service provider terminal 120 may include interface components, which may provide interfaces to one or more input devices, such as one or more keyboards, mouse devices, touch screens, track pads, trackballs, scroll wheels, digital cameras, microphones, sensors, and the like, that enable service provider terminal 120 to receive data from one or more users (such as via user terminal 120).

In exemplary embodiments of the disclosed technology, service provider terminal 120 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While service provider terminal 120 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the terminal 120 may include a greater or lesser number of components than those illustrated.

Service provider database 130 may have one or more processors 132 and one or more memory 134, which may be any suitable repository of merchant data. Service provider 130 may be located at a service provider database 130 location, off-site at another service provider location, or at a third-party location. Information stored in memory 134 may be accessed (e.g., retrieved, updated, and added to) via network 190 by one or more devices (e.g., service provider terminal 120). Memory 134 may store information relating to, as non-limiting examples, a user profile, RFID and/or beacon configurations, and merchant information.

Merchant terminal 140 may have one or more POS devices 142 that communicate with one or more devices (e.g., user device 110) via network 190. In some embodiments, POS device 162 may communicate with one or more devices (e.g., user device 110) using short-range communication.

Merchant database 150 may have one or more processors 152 and one or more memory 154, which may be any suitable repository of merchant data. Merchant database 150 may be located at the POS location, off-site at another merchant location, or at a third-party location. Information stored in memory 154 may be accessed (e.g., retrieved, updated, and added to) via network 190 by one or more devices (e.g., service provider terminal 120) of system environment 100. Memory 154 may store information relating to products and services offered by merchants such as pricing, quantity, availability, discounts, reviews, and any other such generally available information that a consumer may utilize in making a purchasing decision. In some embodiments, memory 154 may also include location information associated with products and services that identifies the location(s) that a particular product or service is available for purchase. In some embodiments, the location information may include an identification of a particular store, terminal, or kiosk that the product or service may be purchased from.

Beacon 170 may output a signal (e.g., constantly, periodically, or randomly). In some embodiments, one or more of the beacons 170 may be positioned proximate a POS location and configured to output a signal to one or more other devices of the system 100 that are within a predetermined range of the respective beacon 170 (e.g., to user device 110 of a customer walking through a store). The signal may include preset information. For example, the information may be detected by the user device 110 (e.g., an application executing on the user device 110), which triggers the user device 110 to perform some action. In some cases, beacon 170 may be modified (e.g., to change the information transmitted or the transmission pattern/strength). Beacon 170 may be connected to network 190, and may be, as a non-limiting example, modified by service provider terminal 120.

The signal of a beacon 170 may contain two numbers referred to herein as the beacon's major and minor identifiers. These identifiers may be used to identify the beacon's location. In particular applications, the beacon's major identifier may be associated with a relatively large area or building (e.g., a store or other business) in which multiple beacons may be positioned. In such applications, the minor identifier may be associated with a smaller area (e.g., a retail department) that is within the larger area and within which the particular beacon is located. In some applications, the beacon's signal may also include a source identifier that identifies the controlling entity (e.g., a merchant) associated with the beacon. As is discussed in more detail below, the user device 110 may be configured, not only to detect the signal from a beacon 170, but to determine a signal strength as well. This may allow the determination of a distance from the beacon 170.

NFC device 180 may be any form of NFC transmitter and/or receiver. In particular embodiments, the NFC device 180 may be or comprise an RFID transmitter or receiver. Such a device may be active or passive and may be in communication with other RFID-capable devices in the system 100. In some embodiments, the NFC device 180 may be configured to broadcast predetermined information, thereby acting as an NFC transmitter configured to communicate with an NFC reader. For example, user device 110 may receive (e.g., using an application) transmitted information from an NFC device 180. In some cases, user device 110 may then transmit the received information to service provider terminal 120. Service provider terminal 120 may reference data stored in service provider database system 130 to determine what trigger NFC device 180 represents. For example, in some cases, NFC device 180 may be associated with a location either directly (embedded NFC device information) or indirectly (NFC device information is a location pointer), and confirmation of user device 110 being within a predetermined range of that location may trigger one or more predetermined actions or steps of a method described herein. In some cases, service provider terminal 120 may transmit the interpretation of the data back to user device 110.

While the NFC device 180 may often be an RFID device, this is merely an example, and one of ordinary skill will recognize that various different types of contactless interface points may be utilized in system environment 100. For example, one or more of NFC tags, RFID stickers, and NXP MIFARE stickers, as well as interface points for different frequency readers (e.g., readers attuned to non-traditional contactless interface point tunings), non IoT devices, and contactless interface points designed for different technologies (e.g., sonic readers or X-ray readers) may be used within system environment 100. User device 110 may receive and read transmissions from the various types of contactless interface points in similar manner as discussed herein, or as modified in a manner understood by one of ordinary skill in light of the present disclosure. The user device 110 may utilize the information gathered from the various NFC devices 180, for example, as "location-based IDs," as triggers to perform a function, or to contact a database for more information, as will be discussed in greater detail below.

Network 190 may be of any suitable type, including individual connections via the internet such as cellular or WiFi networks. In some embodiments, network 190 may connect terminals using direct connections such as radio-frequency identification (RFID), near-field communication (NFC), Bluetooth', low-energy Bluetooth' (BLE), WiFi™, ZigBee', Z-Wave', ambient backscatter communications (ABC) protocols, USB, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Location based services (LBS) are often dependent on GPS and user-confirmed tracking input. In the related art, users may be prompted by the LBS to select their locations when GPS is unavailable. For example, GPS is often unreliable when inside a building (e.g., inside a mall), so LBSs rely on user-selected locations to determine what store a user is in. This can lead to LBS location requests out of context to where the LBSs would be useful. Thus, users may be inconvenienced by inconsistent LBS availability, and annoyed by unwarranted LBS requests. Accordingly, users may deactivate, deactivate, or otherwise limit the LBS and related capabilities, which decreases user engagement and LBS utility. Accordingly, certain aspects of the present disclosure relate to the use of contactless interface points (e.g., RFIDs) to provide location information, which may be used to improve LBS services.

FIG. 3A illustrates a system environment for implementing certain aspects of the present disclosure. In the system environment of FIG. 3A, a user device (e.g., user device 110, which may be a mobile device) operated by a user, an NFC device (e.g., an RFID sticker), a network (e.g., network 190), and a database (e.g., service provider database system 130) may interact. The user may operate the user device to execute an RFID reader application, and the user may move the user device near the RFID sticker. The user device may interpret the information from the RFID sticker and provide the information to the database over the network. The information may include location information (e.g., coordinates, store name and number, geo-coding, encoded location information, or encrypted location information) or RFID information ((e.g., an RFID specifier that is associated with a geographic location in the database). With RFID sticker systems embedded in environments, users may easily "opt-in" to LBS, for example by tapping or otherwise reading RFID touch point s with their devices. This allows location-based data to be generated outside of traditional GPS system networks and enables contextual "opt-in" opportunities relevant to the user's contexts. For example, after checking in by tapping on the RFID sticker (or otherwise reading or scanning a contactless interface point), an LBS may provide the user device information about special events nearby (e.g., photos with Santa or limited-time deals).

In some cases, reading the device may not operate as a strict opt-in to an LBS (i.e., may not have include the user electing to receive future messages of LBS services), but rather provide a user initiated call for information (e.g., from a database). Accordingly, instead of the traditional LBS PUSH content/marketing, there may be provided LBS PULL content/marketing (e.g., a user has precise control over when, where and how they receive the content or marketing materials). For example, a user can "initiate a call" for discount coupons or customer service at precise location by using the user device to read the contactless interface point, and the database may trigger action rules that send out a 10% off discount to customer account or send out a notification to customer service, so customer service can contact the customer at this specify location.

FIG. 3B is an example flowchart of a method of the present disclosure. The user taps an RFID touchpoint with the user device. For example, the user may move the mobile device within a predefined range of RFID sticker. The user device reads the RFID with NFC. For example, user device may constantly or regularly poll for RFID information. The user device sends the RFID information to the network. The RFID information may include location information of the RFID. The network stored the RFID location information in the database associated with the user profile. In some cases, an external device (e.g., service provider terminal 120) may utilize the RFID location information to push services or functions to the user device. The database may also relay the location information back to the user device or an application executing on the user device (e.g., if the location information is encoded or otherwise not easily determinable by the RFID information). The user device may then perform actions, execute applications, and/or initialize functions based on the location information. In some cases, user location history may be captured, for example, for future behavioral analysis and/or to correlate with transaction locations to identify fraudulent behaviors.

As a non-limiting example, consider two users "A" and "B" in a same location at the same time. Both users use their user devices to read contactless interface points at the location and provide the location information to the database. The database determines location-based rules and user preferences, and then the database sends respective triggers (e.g., different triggers) to the user devices. Accordingly, User A may receive a discount, and User B might be provided new product introduction, despite reading a same contactless interface point at a same time.

In many instances, a user's mobile device may require an action to place it in an active state for receiving NFC transmissions. By not having a default active state, a hurdle is placed between the user and ready NFC communication. This can create inefficiencies in, for example, reading RFID signals using a mobile interface device (e.g., a smartphone). An aspect of the present invention is to make use of beacon technology to automatically activate and deactivate an NFC reader of a user device (particularly, a mobile interface device) without a required action on the part of the user. This provides significant improvements in efficiency and other functional advantages over the related art.

Figure 4A:
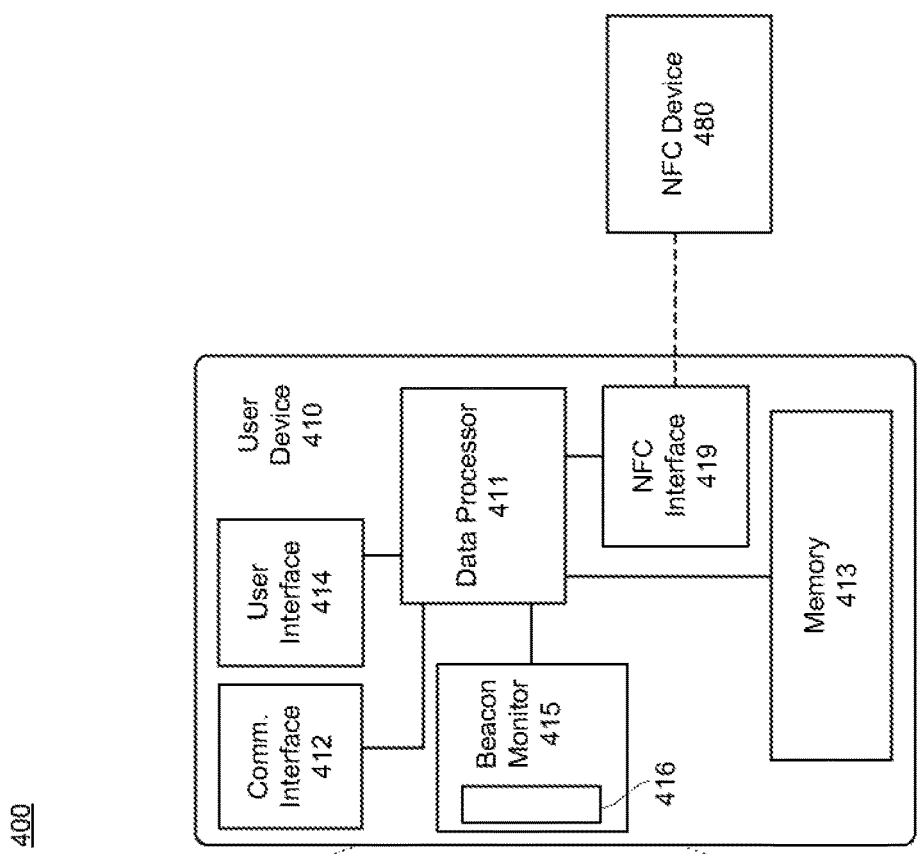
FIG. 4A illustrates a system for activating the NFC capability of a user device according to an embodiment of the invention.

FIG. 4A illustrates a system environment 400 for certain aspects of the present invention. In the system environment of FIG. 4A, a user device 410 (e.g., a mobile interface device) operated by a user, one or more NFC devices 480 (e.g., RFID tags or other transmission devices), and one or more beacons 470. In the descriptions that follow, the system environment 400 is a retail environment in the form of a retail store having multiple sales departments. It will be understood, however, that the invention is not restricted to the retail environment. Each beacon 470 is disposed within the store in the area of one of the sales departments (or another area) and has a major location identifier associated with the retail store location and a minor location identifier associated the sales department (or other area) location. Each beacon 470 is configured to broadcast a signal comprising its major and minor identifiers. In some embodiments, the beacon signal may also comprise a source identifier associated with the beacon-controlling entity (e.g., the merchant or parent company associated with the retail store). The beacons 470 will typically have an associated range volume throughout which the broadcast signal strength exceeds a level detectable by typical user devices.

The NFC devices 480 may be any NFC enabled transmitter and/or receiver positioned within the retail store. Each NFC device 480 may be specifically configured for communication with NFC-enabled user devices. In some embodiments, some or all of the NFC devices 480 may be part of or associated with merchant terminals and/or POS devices within the retail store.

As shown in FIG. 4A, the user device 410 includes an on-board data processor 411 in communication with a memory module 413, a user interface 414, a communication interface 412, a beacon monitor 415, and an NFC interface 419. The data processor 411 can include a microprocessor and associated processing circuitry, and can contain additional components, including processors, memories, error and parity/CRC checkers, data encoders, anticollision algorithms, controllers, command decoders, security primitives and tamper-proofing hardware, as necessary to perform the functions described herein. The memory 413 can be a read-only memory, write-once read-multiple memory or read/write memory, e.g., RAM, ROM and EEPROM, and the user device 410 can include one or more of these memories.

The user interface 414 includes a user input mechanism, which can be any device for entering information and instructions into the user device 410, such as a touch-screen, keyboard, mouse, cursor-control device, microphone, stylus, or digital camera. The communication interface 412 is in data communication with the data processor 411 and is configured to establish and support wired or wireless data communication capability for connecting the device 410 to a communication network. The beacon monitor 415 is in data communication with the data processor 411 and is configured to receive and process transmissions from the one or more beacons 470 via an antenna 416 or other beacon signal receiver, convert the signal to digital data, and forward the digital data to the data processor 411. The beacon monitor 415 may further be configured to determine the signal strength of a received transmission. The NFC interface 419 is in data communication with the data processor 411 and is configured for establishing near field communication with any of the one or more NFC devices 480. Information received via the NFC interface 419 is forwarded to the data processor 411.

In various embodiments of the invention, the memory 413 may have stored therein one or more applications each comprising a plurality of instructions usable by the data processor 411 to conduct and/or monitor transactions between the user device 410 and merchant terminals, service providers, and transaction processing servers. These applications may include instructions usable by the data processor 411 to identify transaction events, store event data in the memory 413, and communicate event data to a transaction processor and/or a transaction monitoring system. Some applications may also include instructions relating to receiving and interpreting instructions from the transaction processor or transaction monitoring system.

The memory 413 has stored therein an NFC application comprising a plurality of instructions usable by the data processor 411 to establish communication with an NFC transmission device via the NFC interface 419. The NFC application is configured to have an active state in which placement of the user device 410 in contact with or within a predetermined NFC communication distance of an NFC device 480 causes the NFC device 480 to transmit information receivable via the NFC interface 419. The NFC application is further configured to have a passive state in which NFC communication is not established when the user device 410 is placed in contact with or within the predetermined NFC communication distance of an NFC device 480.

The memory 413 also has stored therein a beacon monitoring application. The beacon monitoring application is operable as a background application comprising a plurality of instructions usable by the data processor 411 to receive and process signal data from the beacon monitor 415. The beacon monitoring application is configured, in particular, to determine from the signal data, location identity information for the beacon 470 broadcasting the signal from which the signal data is derived.

In an exemplary scenario, a user may cause the user device 410 to execute the beacon monitoring application in the background to detect beacons 470. When the user enters the broadcast area (or "zone") of a recognized beacon 470, the beacon is detected by the user device 410 and the NFC reader application on the user device is activated. The user may then use the user device 410 to interact with NFC transmitters within the broadcast area. This would allow, for example, instant reading of RFID information at a given location or touchpoint. Once the RFID information has been read, the user device 410 may operate in accordance with the discussion of other example embodiments herein. For example, the user device may output location information to a network, launch an application, launch a mobile function, or execute a transaction When the user leaves the beacon's broadcast area, immediately or shortly thereafter, the NFC application will revert to its passive state. In some instances, leaving the beacon zone may trigger an additional or alternative action of the user device (e.g., an action in addition to or instead of transitioning to the NFC passive state). For example, if the beacon zone is in a store, leaving the beacon zone without making a purchase may trigger a discount request from the user device.

Figure 4B:
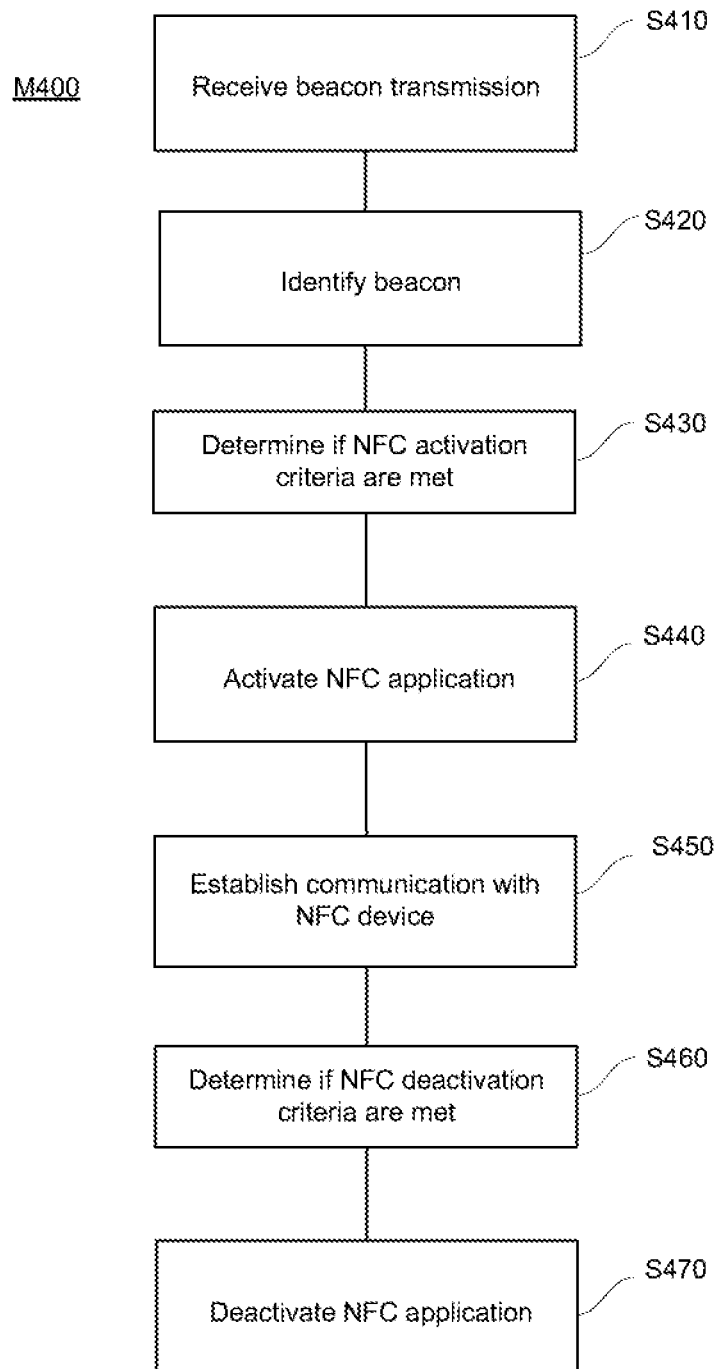
FIG. 4B is a flowchart of a method of activating an NFC application on a mobile interface device according to an embodiment of the invention.

FIG. 4B illustrates a method M400 of activating an NFC application in a user device 410 in accordance with an embodiment of the invention. The user device 410 may be, in particular, a mobile interface device such as a smart phone or tablet or other mobile device. At S410, a transmission from a beacon 470 is received by the user device 410, This will generally be the result of the user entering the transmission area of the beacon 470. As discussed above, the signal from the beacon 470 will include at least one beacon identifier, which can be used to identify the beacon 470 at S420. At S430, the user device 410 determines whether the criteria for activating the NFC capability of the user device have been met. Responsive to a determination that the activation criteria have been met, the NFC application of the user device 410 transitions from a passive state to an active state at S440. At S450, communication is established between the user device 410 and an NFC transmitting device (e.g., an RFID tag or POS device) disposed within the beacon transmission area. Additional NFC communications with other NFC transmitting devices can also be established. At S460, the user device 410 determines whether NFC deactivation criteria have been met. Responsive to the deactivation criteria being met, the NFC application of the user device 410 transitions from the active state to the passive state at S470.

While traditionally only a single interaction is possible with RFID devices (i.e., an RFID is read or not), which limits the functionality of RFID devices to merely providing/acquiring a single source of information, certain aspects of the present disclosure relate to the gesture-based interactions with one or more RFIDs.

Figure 5B:
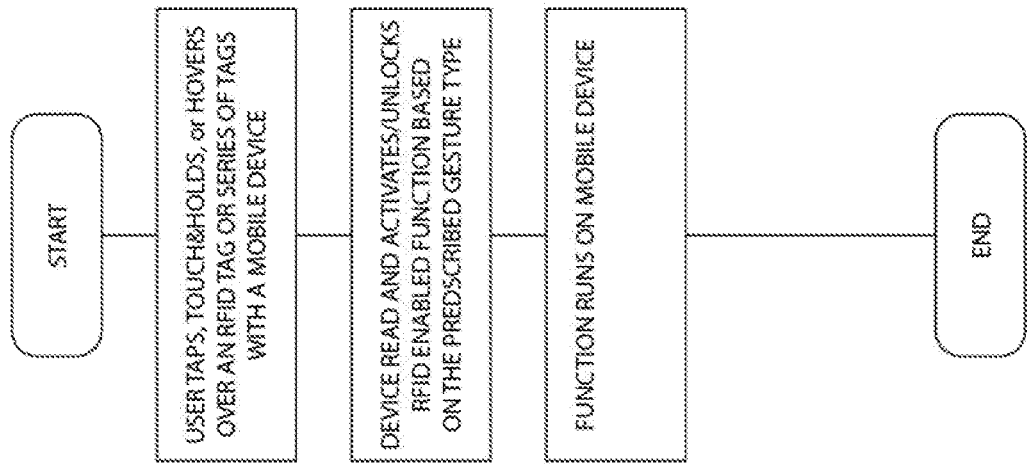
FIG. 5B is an example flowchart of a method of the present disclosure.
Figure 5A:
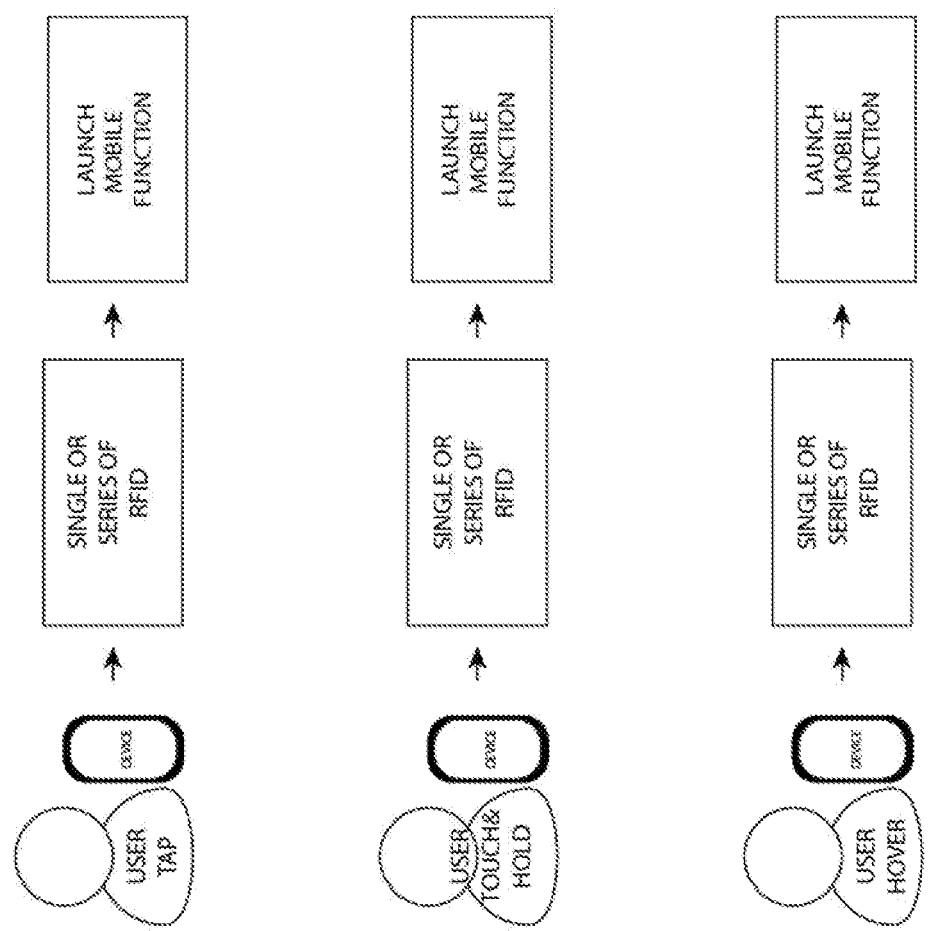
FIG. 5A illustrates flow diagrams of certain aspects of the present disclosure.

FIG. 5A illustrates flow diagrams of certain aspects of the present disclosure. Based on the type of interaction with one or more RFID devices, the user device may perform different functions. For example, in 500-*a*, a user taps the user device (in RFID reader mode) to one or more RFID tags. The tap is detected by the user device, which in turn launches a first function ((e.g., a mobile function, launches an application, or performs some action). Tapping may be determined by an amount of time an RFID tag may be read being less than a threshold (e.g., how many times user device can read information from the RFID tag). At 500-*b*, the user touches the user device to one or more RFID tags and holds the user device for an extended period of time ((e.g., extended as compared to "tapping"). Touch and hold may be distinguished from tapping by an amount of time an RFID may be read being greater than the threshold. In some cases, more than one threshold read time or read numbers may create various hold-lengths, which launch different functionalities. In response, the user device may launch a second predetermined function. At 500-*c*, the user hovers the user device over one or more RFID tags. Thus, in contrast with a touch and hold or tap, the user device maintains a distance from the RFIDs. Hovering may be determined based on a strength of the RFID signal. For example, when an RFID is touched, a signal strength may be above a certain threshold is determined. When the RFID tag is hovered over (e.g., spaced apart of the user device), a signal strength may be below the strength threshold. In some cases, a plurality of signal strength thresholds (e.g., inch v. foot) and/or hovering time thresholds may be utilized to launch different functionalities. In response, the user device may launch a third predetermined function. In some cases, signal strength changes of the RFID tag may be recorded and used to customize differences if read distance and time to specific users. Furthermore, in some cases, a speed of approach and/or a pattern of approach or removal may be used to identify specific functions or otherwise specialize various gestures.

FIG. 5B is an example flowchart of a method of the present disclosure. The user performs one or more functions with the user device and the RFID tags. For example, the user may tap, touch and hold, or hover the user device to one or more RFID tags. The user device reads information from the one or more RFID tags, determines a type of gesture, and performs a function in accordance with the gesture and the RFID tag (e.g., the RFID information).

As will be understood in light of the present disclosure, a gesture may be performed with a single RFID tag or a plurality of RFID tags. In some cases, a sequence of gestures may be performed with a plurality of RFID tags. For example, a user may tap the user device to three different RFID tags in different orders to invoke different function. In some cases, a sequence of gestures may be performed on a single RFID tag. For example, a user may tap user device to a first RFID tag, and then hover the user device over the RFID tag. In some cases, gestures performed with the one or more RFID tags may be combined with gestures performed on the user device. For example, a user may tap an RFID tag and shake the user device, which launching a first function, or tap the RFID tag and rotate the user device, which launches a second function. Thus, as non-limiting example of improvements to RFID technology, RFID communication, and user devices, certain aspects of the present disclosure utilize one or more from among: a plurality of RFID tags; a sequence of RFID tags; RFID gestures; a sequence of RFID gestures; user device gestures; time between RFID and/or user device gestures (e.g., shave and a haircut timing); and accelerometer data. Accordingly, certain aspects of the present disclosure, working with a single or series of RFID tags, may exponentially extend the gesture-based interaction potential.

In some cases, customers belong to numerous loyalty and/or rewards programs. However, the related art does not provide simple ways for users to aggregate promotional data or track their loyalty programs from multiple merchants. Moreover, in the related art, RFID information is static or otherwise difficult to change. Accordingly, certain aspects of the present disclosure relate to the use of RFID tags (e.g., RFID stickers) to collect promotional or incentive-based data.

Figure 6B:
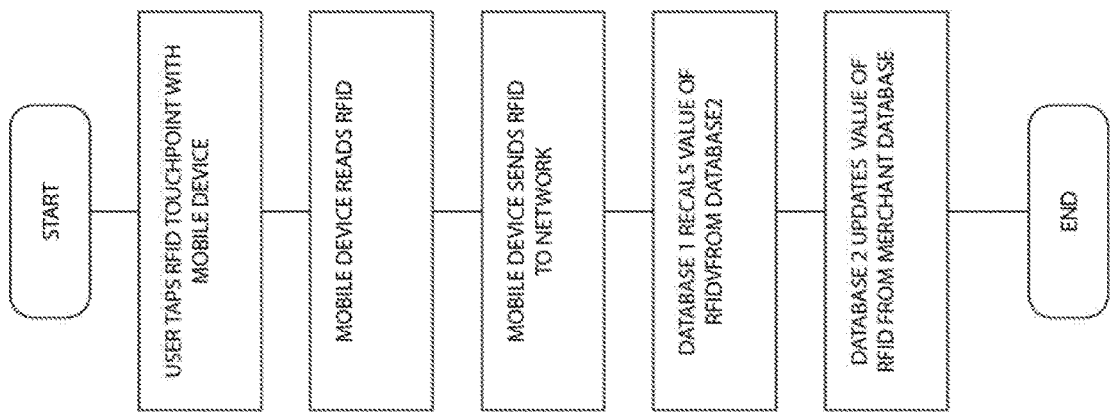
FIG. 6B is an example flowchart of a method of the present disclosure.
Figure 6A:
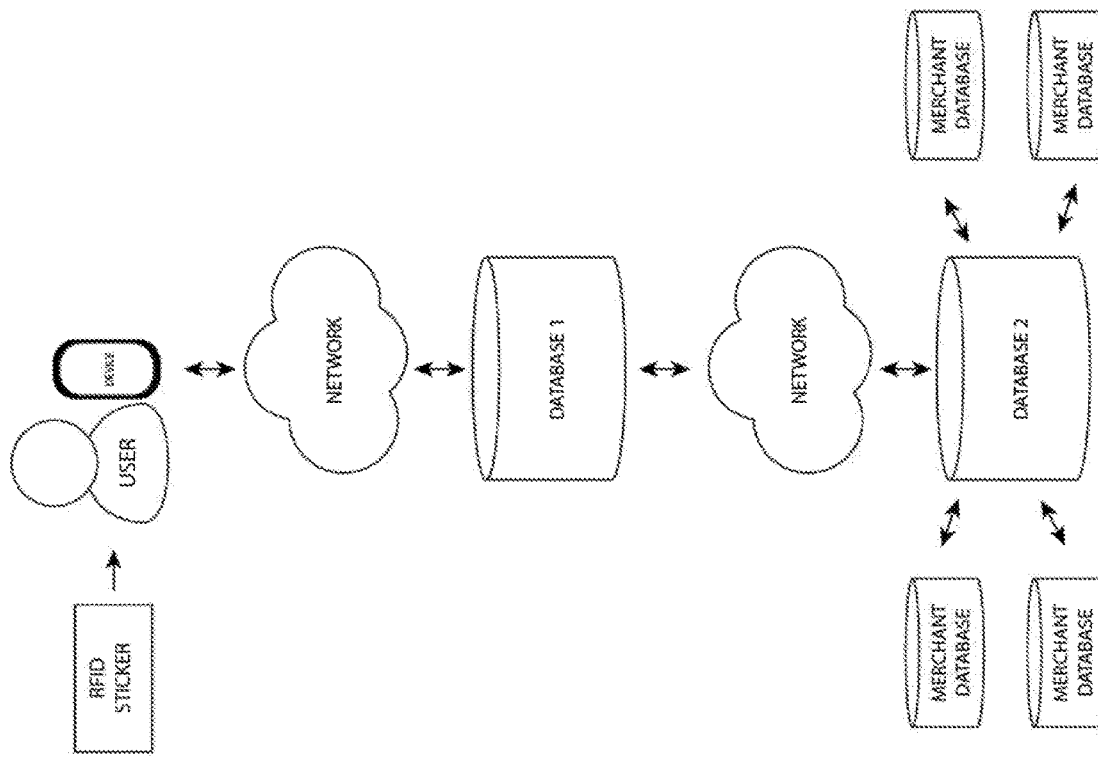
FIG. 6A illustrates a system environment for implementing certain aspects of the present disclosure.

FIG. 6A is a system environment for implementing certain aspects of the present disclosure. In the system environment of FIG. 6A, a user device (e.g., user device 110, which may be a mobile device) operated by a user, an NFC device (e.g., an RFID sticker), a network (e.g., network 190), database 1 (e.g., service provider database system 130), database 2 (e.g., a second service provider database system 130), and one or more merchant databases (e.g., merchant database systems 150) may interact. The user may operate the user device to execute an RFID reader application, and the user may move the user device near the RFID sticker. The user device may read the RFID sticker and send the RFID information to database 1 over the network. Database 1 may recall (e.g. retrieve) the value for the RFID sticker from database 2 (e.g., over the network). Database 2 may receive updates to the RFID value from the merchant databases. In some cases, utilizing database 1 and database 2 provides a platform for partner aggregation and collaboration. For example, database 1 may be controlled by a first, and database 2 may be controlled by a partner merchant. In some cases, database 1 and/or database 2 may be controlled by one or more entities.

The RFID information may be static or otherwise difficult to change. For example, the RFID information may include an identifier for the RFID sticker. Functionality associated with the RFID sticker may therefore be determined based on mappings in database 1 or database 2. The merchant databases may set or change the functionality associated with the RFID sticker, for example, but accessing database 2 over the network. As a non-limiting example, the RFID sticker may be placed a first merchant location (e.g., at a store entrance). Upon entering the store, the user may tap the RFID sticker. The user device reads and sends the RFID information to database 1. Database 1 requests that database 2 indicate functionality is associated with the RFID sticker ((e.g., functionality set by the corresponding merchant database). Database 2 may notify database 1 about the associated functionality, for example, a 10% discount on purchases that data. Database 1 may relay that information to the user device. Thus, the user is notified about the daily discount. Merchant database may adjust the meaning (e.g., value or action taken) associated with the RFID sticker as often as desired (e.g., daily or weekly), and the same RFID sticker may therefore be mapped to different information or functionality.

FIG. 6B is an example flowchart of a method of the present disclosure. The user places the user device near the RFID sticker. The user device reads the RFID information and sends the RFID information to database 1 over the network. Database 1 recalls the value of the RFID from database 2. Database 2 be updated by merchant databases, thus changing the value of RFID.

In the prior art, the information transmitted by and the functionality associated with an RFID device are typically static (i.e., unchanging and unchangeable). Certain aspects of the present invention, however, enhance RFID functionality by allowing a system provider (or, in some cases, an individual user) to associate variable rules with a particular NFC device (e.g., an RFID device). The present invention also provides for the generation and transmission of variable information that can be used to authenticate communication between a user device and the transmitting NFC device.

Figure 7A:
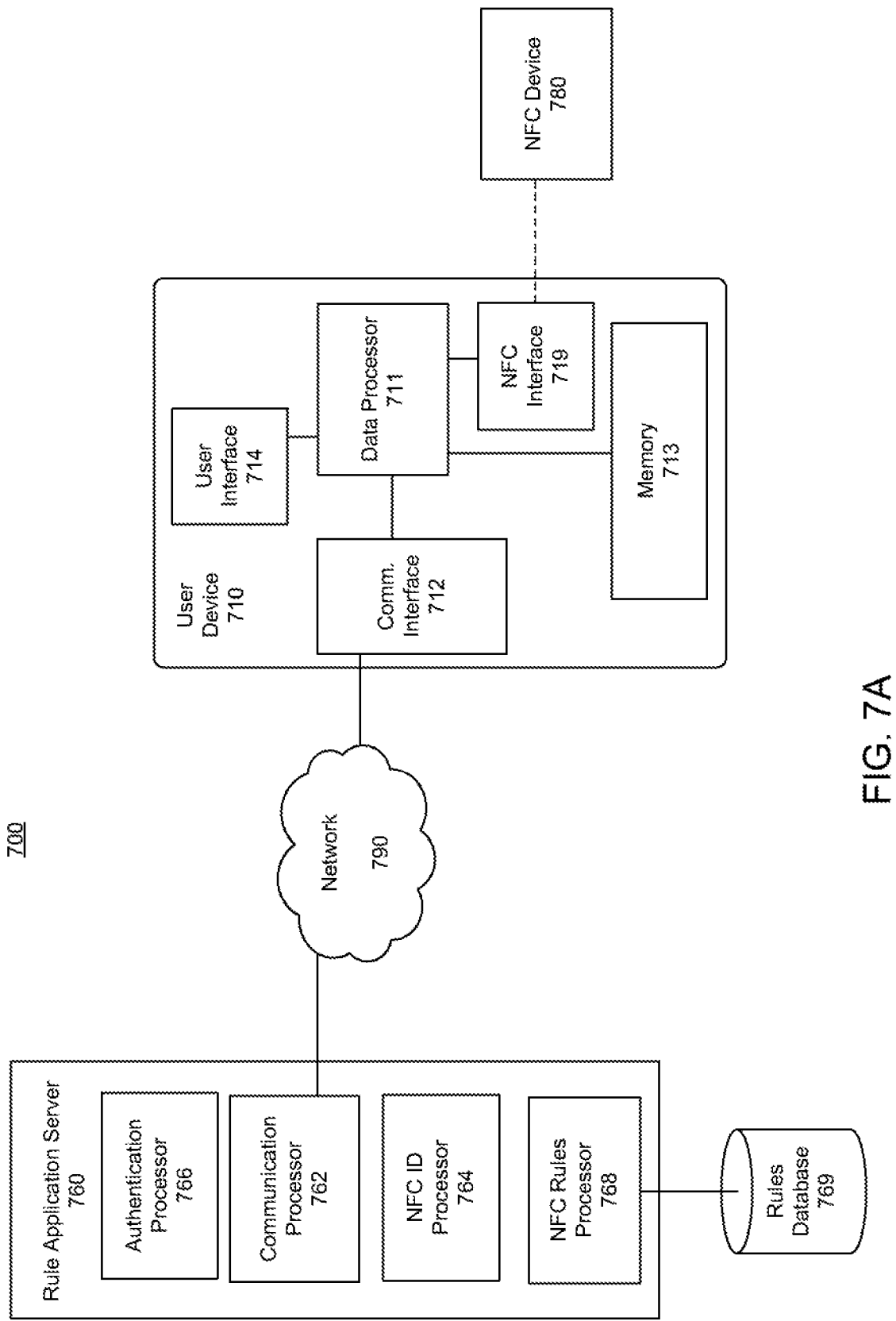
FIG. 7A illustrates a rules-based NFC communication system according to an embodiment of the invention.

FIG. 7A illustrates a rules-based NFC communication system 700 for implementing methods according to embodiments of the present invention. The system 700 includes a user device 710 (e.g., a mobile interface device) operable by a user and configured for communication with one or more NFC devices 180 (e.g., RFID tags or stickers).

The user device 710 includes an on-board data processor 711 in communication with a memory module 713, a user interface 714, a communication interface 712, and an NFC interface 719. The data processor 711 can include a microprocessor and associated processing circuitry, and can contain additional components, including processors, memories, error and parity/CRC checkers, data encoders, anticollision algorithms, controllers, command decoders, security primitives and tamper-proofing hardware, as necessary to perform the functions described herein. The memory 713 can be a read-only memory, write-once read-multiple memory or read/write memory, e.g., RAM, ROM and EEPROM, and the user device 710 can include one or more of these memories.

The user interface 714 includes a user input mechanism, which can be any device for entering information and instructions into the user device 710, such as a touch-screen, keyboard, mouse, cursor-control device, microphone, stylus, or digital camera. The user interface 714 may also include a display, which can be any type of device for presenting visual information such as a computer monitor, a flat panel display, and a mobile device screen, including liquid crystal displays, light-emitting diode displays, plasma panels, and cathode ray tube displays.

The communication interface 712 is in data communication with the data processor 711 and is configured to establish and support wired or wireless data communication over a communication network 790. The NFC interface 719 is in data communication with the data processor 711 and is configured for establishing near field communication with any of the one or more NFC devices 780. Information received via the NFC interface 719 is forwarded to the data processor 711.

In various embodiments of the invention, the memory 713 may have stored therein one or more applications each comprising a plurality of instructions usable by the data processor 711 to carry out functions, and/or to conduct transactions between the user device 710 and merchant terminals, service providers, and transaction processing servers. These applications may include instructions usable by the data processor 711 to identify transaction events, store event data in the memory 713, and communicate event data to a transaction processor and/or a transaction monitoring system. Some applications may also include instructions relating to receiving and interpreting instructions from a transaction processor, transaction monitoring system, or other server.

In particular, the memory 713, has stored therein an NFC application comprising a plurality of instructions usable by the data processor 711 to establish communication with an NFC device 780 via the NFC interface 719 and to receive NFC information from the NFC device 780. The NFC application may further include instructions to transmit some or all of the NFC information to a rule application server 760 over the network 790 via the communication interface 712. The NFC application may be configured to implement instructions received from the rule application server 760 in response to the NFC information transmission. As will be discussed, such instructions may be determined by the rule application server 760 based on rules associated with the particular NFC transmission device. In some embodiments, the NFC application may be configured to recognize a URL identifier in the NFC information and to cause the user device to initiate a web browser session and to navigate to the page specified by the URL identifier.

The memory 713 may also have stored thereon a transaction function association application. In some embodiments, this application may comprise a plurality of instructions to be carried out by the data processor upon establishment of communication with an NFC transmitting device. The instructions may, in particular, cause the device 710 to transmit received NFC information by the transaction processing device to a rules processor and receive a tag rule communication from the rules processor. The tag rule communication may include an instruction for the transaction application to carry out a transaction function associated with the tag identifier. Alternatively, if no transaction function has been assigned to the tag identifier, the rule communication may include a request to associate a new transaction function with the tag identifier. This request may include a plurality of function options and the transaction function association application may be further configured to cause the display of these options, receive a transaction function selection, and transmit a request response to the rules processor. In other embodiments, the transaction function association application may be configured to initiate an interactive session with the rules processor to specify a transaction function to be associated with the tag identifier.

The one or more NFC devices 780 may be any NFC enabled transmitter and/or receiver. Each NFC device 480 may be specifically configured for communication of NFC information to NFC-enabled user devices. Each NFC device 780 has an associated NFC device identifier that is typically included in the transmitted NFC information. The device identifier is unique to the specific NFC device 780, and, once assigned, cannot be changed. In addition to static information (i.e., information that does not change from communication-to-communication) such as the device identifier, the NFC devices 780 may be configured to include dynamic information in the transmitted NFC information. Such dynamic information is generated by the NFC device and is different for each communication and may be or include, for example, encrypted information. In some embodiments, the NFC device 180 may be configured to generate, for each new NFC communication, an encrypted verification block and include it with NFC information transmitted to a receiving device during the communication. As will be discussed, such an encrypted verification block may be used by a merchant system 150, a service provider system 130 or other system or server associated with the NFC device to verify the authenticity of the NFC device 780 and confirm user device 710 interaction therewith.

In some embodiments, some or all of the NFC devices 780 may be part of or associated with merchant terminals and/or POS devices within the retail store.

In particular embodiments, the NFC devices 780 are RFID tags. In some applications, such RFID tags may be used by a merchant in a retail environment. Merchants may, for example, position RFID tags in conjunction with product displays or in information kiosks within a retail store. As will be discussed, the methods of the present invention allow the effect of interaction with these RFID tags to be varied according to rules set by the merchant without altering the tags themselves in any way. In other applications, RFID tags may be used by individual users who are provided with a degree of control over the effect of interaction with them.

As suggested above, in some embodiments, the NFC information transmitted by the NFC devices 780 may be or include a URL associated with a web page.

The rules-based NFC communication system 700 includes a rule application server 760, which may be part of a merchant system 150, a service provider system 130 or other system or server associated with the one or more NFC devices 780. The rule application server 760 includes a communication processor 762 configured for selective communication over the network 790. The communication processor 762 is configured, in particular, for communication with the user device 710 via the network 790 and for receiving NFC information received by the user device 710 in an NFC communication interaction with an NFC device 780 and forwarded by the user device 710. Upon receiving the NFC information, the communication processor 762 may forward the NFC information to an NFC identification (ID) processor, which is configured to determine the identifier of the NFC device 780. In embodiments where the NFC information includes an authentication component in addition to the NFC device identifier, the NFC information may be forwarded to an authentication processor 766. The authentication processor 766 is configured to use the NFC identifier and the authentication component to verify that an authentic interaction between the user device 710 and the identified NFC device 780 actually occurred. In particular embodiments where the NFC device 780 is configured to include a communication-specific encrypted verification block in the NFC information, the authentication processor 766 may be configured to decrypt the encrypted verification block and use the result to verify the authenticity of the communication. If the communication is deemed non-authentic, a message to that effect is returned to the user device 710.

Once the NFC device identifier has been determined and, if applicable, the NFC communication is authenticated by the authentication processor 766, the device identifier is passed to an NFC rules processor 768. The NFC rules processor 768 is in communication with a rules database 769 in which rules associated with the one or more NFC devices 780 are stored. The NFC rules processor 768 is configured to use the NFC identifier to determine if a rule is associated with that identifier. If so, the NFC rules processor 768 verifies that any additional criteria for rule application are met and takes action as specified in the rule. Rule-specified actions may be or include actions in relation to a user account associated with the user device 710 and/or actions to transmit information and/or instructions to the user device 710 (or other specified device associated with the user device 710 or the user account) over the network 790 via the communication processor 762. Instructions to the user device 710 may include instructions to display information on the user device 710, alter a setting of the user device 710, activate an application or function within an application on the user device 710, initiate an interactive communication session with the user device 710, initiate, complete or otherwise carry out a transaction, or provide an offer to the user.

The rules database 769 has stored therein records associating actions with NFC devices 780. Typically, a specified action is to be taken upon receipt of a notification of a communication between a user device 710 and an NFC device 780 for which the action is specified. In some embodiments, however, additional rule-application criteria may be specified. The action associated with a particular NFC device 780 may be assigned or changed at any time to reflect the desire of the owner or manager of the NFC device 780.

In a scenario where the NFC device 780 is used by a merchant in a retail store setting, the action could be established according to the needs of the merchant. For example, if an NFC device 780 were to be incorporated into a display for a temporary product promotion, a rule-based action to provide information or an offer related to the product could be associated with the NFC identifier in the rules database 769. At the end of the promotion, the NFC device 780 could be moved to a different part of the store for a different promotion or other use, at which time the rule-based action associated with the NFC identifier for the NFC device would be changed.

In some embodiments, the NFC rules processor 768 may be configured to change the action associated with an NFC device 780 based on the occurrence of an event. In particular, the associated action may be changed based on the occurrence of a communication between the user device 710 and the NFC device 780. For example, the original action associated with an NFC device could be to transmit an offer of a percentage discount to the user of the user device 710. After notification of a first communication with the NFC device 780, the NFC rules processor could cause the transmission of the discount offer to the user device 710, and then modify the rule-based action associated with the NFC device 780 so that upon occurrence of a subsequent communication an offer is transmitted with a different discount percentage. Alternatively, the second and subsequent NFC communications could result in transmission of information only, with no discount offer.

In some applications, an NFC device 780 may be provided to a home-based user to simplify actions associated with the user's account or operation of certain devices. In such applications, the user may use the user device 710 to establish communication with the rule application server 760 to associate a rule-based action with the NFC device 780. In some embodiments, the communication processor 762 may be configured to establish an interactive communication session with the user device 710 via a web page. In such embodiments, the NFC rules processor 768 may be configured to present rule options to the user and receive a selection specifying an action to take when NFC communication is established between the user device 710 and the NFC device 780. Such actions could include, for example, transmission of instructions to the user device 780 to place a predefined order, make a payment, display account information, or initiate a transaction. In some embodiments, the associated action could be to transmit an operation command to an appliance or other device associated with the user or a user account.

In a particular non-limiting example, a merchant may provide to a user an RFID tag configured for transmitting RFID information including an identifier for the RFID tag. A rules-based action may be associated with the RFID tag at the time it is provided to the user or the user may subsequently assign an action via a rules processing server of the merchant. For example, the user may log-in to the user account on the user device and scan the RFID sticker to associate the RFID sticker and/or its information with the user account. Thereafter, when the RFID sticker is read by the user device, the appropriate functionality will be performed. In some cases, a same RFID sticker may be independently associated with different user accounts/user devices, such that a first function will be executed when a first user device reads the RFID sticker, while a second function will be executed when the second user device reads the RFID sticker.

Once associated with the RFID tag, an action may be retrieved from the merchant's NFC rules database. The RFID identifier may also be associated with an account the user has with the merchant (e.g., a user account). The user may then position a user device near the RFID tag to establish communication and receive the NFC information. The NFC application resident on the user device notifies the merchant's rules processing server, which retrieves and executes the action associated with the RFID tag. In some embodiments, the user device may display a prompt for the user to confirm that a particular action should be taken. In some embodiments, the user device may automatically coordinate with the merchant database and/or server, as necessary, to perform the function.

The RFID sticker's function may be enabled using, for example, if-this then-that ((IFTTT) applets. In some cases, the function may be an order command (e.g., when the user device reads the RFID sticker, an item is ordered from the merchant) or some other predefined trigger. In some cases, a user may log-into the user account to set or adjust the function associated with the RFID sticker for the user device. Accordingly, the function triggered by the RFID sticker may be reprogrammable, enhancing the functionality of RFID stickers (e.g., RFID tags) and RFID readers. In some cases, a user can utilize a graphical user interface to "program" (e.g., set or select) what happens when the user reads a particular tag (or performs particular gestures with the particular tag). For example, a user may determine (e.g., program or configure) whether reading an RFID sticker at a coffee shop records the user's visit for a loyalty program or places an order for the user's favorite coffee. As another example, a user may determine (e.g., program or configure) whether reading an RFID sticker on a laundry detergent box launches a browser to provide stain removal instructions, or reorders the detergent.

In user-centered embodiments like those described above, the processors of the rule application server 760 may be configured so that if a user device 710 establishes communication with an NFC device 780 that is not in the rules database or that does not have an associated action, the rule application server 760 transmits a request to the user to assign an action to the NFC device or initiates an interactive session to select and assign an action.

Figure 7B:
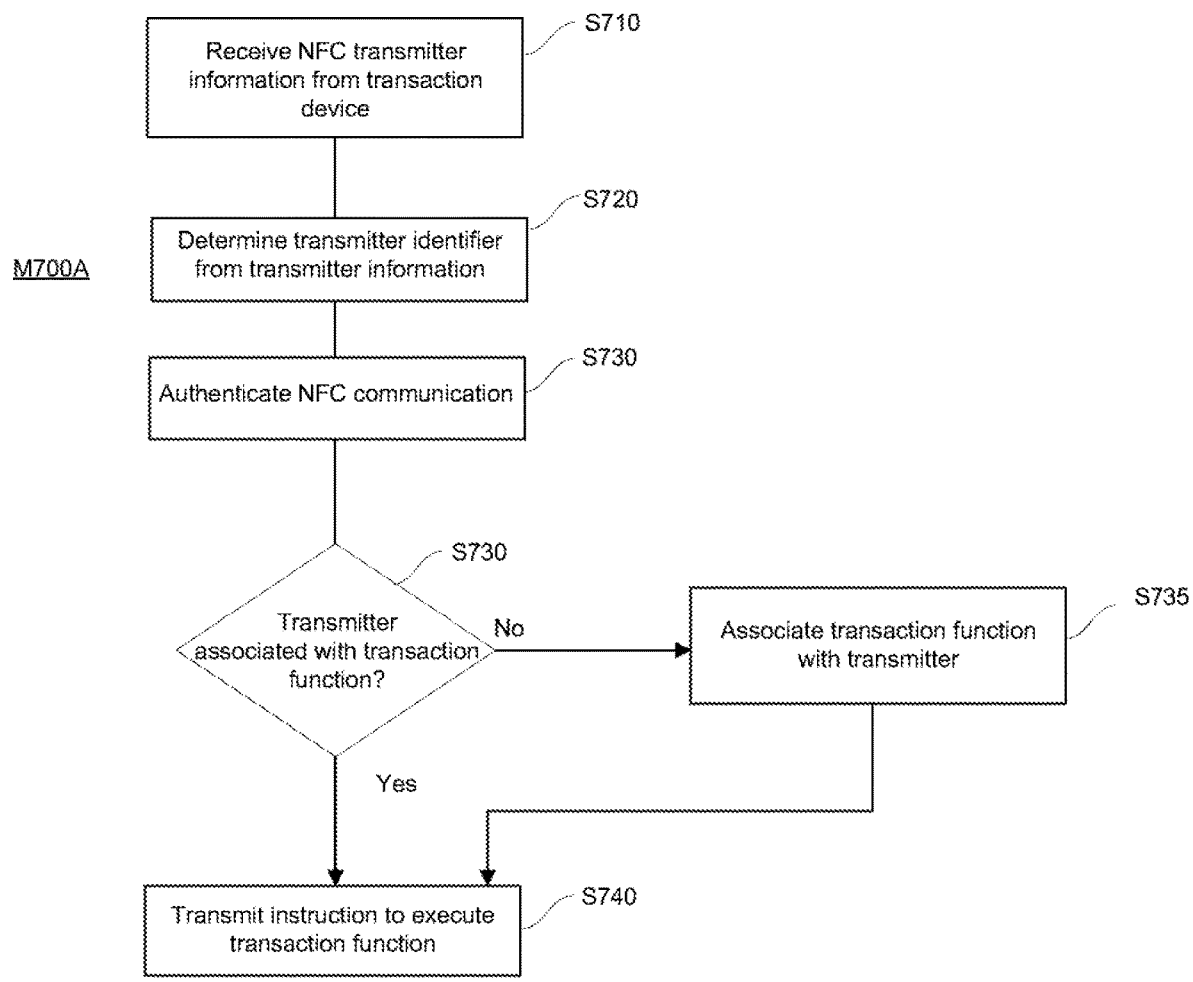
FIG. 7B is a flow diagram of a method of activating a transaction function in a transaction processing device according to an embodiment of the invention.

Embodiments of the above-described system 700 may be used to carry out various methods of the invention. In a particular example, the system 700 can be used to carry out a method of activating a transaction function in a transaction processing device (e.g., a mobile interface device or other user device) associated with a user's account with a particular merchant. FIG. 7B is a flowchart of an exemplary method M700A according to such an embodiment. At S710 of the method M700A, NFC transmitter information is received by a merchant server from the transaction processing device. This information will have been transmitted by the transaction device as a result of the transaction device having established NFC communication with an NFC transmitter device (e.g., an RFID tag) associated with the merchant. The received NFC information includes an identifier for the NFC transmitter device, which is determined from the NFC information by the merchant server at S720. In embodiments where the NFC information includes authentication information in addition to the NFC transmitter device identifier, the method M700A may include using the authentication information to authenticate the NFC communication between the transaction device and the NFC transmitter. Such authentication inhibits or prevents falsification of an NFC encounter. In such embodiments, the authentication information may be or include a data block encrypted using a symmetric key methodology such as that disclosed in U.S. application Ser. No. 16/205,119 filed Aug. 29, 2018, the complete disclosure of which is incorporated herein by reference. The action of authentication may include decrypting the encrypted data block as confirmation that the NFC information was actually generated by the identified NFC transmitter device.

At S730, the merchant server determines whether a transaction function has been associated with the NFC device. This may include querying the merchant's rules database to determine if there is a record assigned to the NFC device or if an assigned record indicates that a transaction function has been associated with the device. If a transaction function has been associated with the NFC transmitter device, the merchant server transmits an instruction to the transaction device to execute the transaction function at S740. in some embodiments, the transaction function may have been established by the merchant. In other embodiments, the transaction function may be established or selected by the user. By way of example, a merchant-established function could be an action to display product information, present an offer, or process a transaction. A user-established function could be an action to place a predefined order with the merchant, process a payment, display account or other information, or display product information. In some embodiments, the function could be to process a command to another device associated with the user or the user account.

In some embodiments, the method M700A may include an action of changing the transaction function associated with an NFC device. This action may, in some embodiments, take place in response to the occurrence of an event. In particular, the transaction function may be changed in response to the occurrence of an NFC communication between the transaction device and the NFC transmitter device and subsequent execution of the transaction function.

If the merchant server determines that no transaction function is associated with the NFC transmitter device, the merchant server may associate a transaction function with the NFC device. In some embodiments, this may include prompting and receiving a transaction function from the merchant. In other embodiments, this may include transmitting an association request to the transaction device or other device associated with the user. Either in response to such a request or through the establishment of an interactive communication session with the user, the merchant server may receive an action selection from the user, which the merchant server associates with the NFC device. The association is then recorded in the merchant's NFC rules database.

Figure 7C:
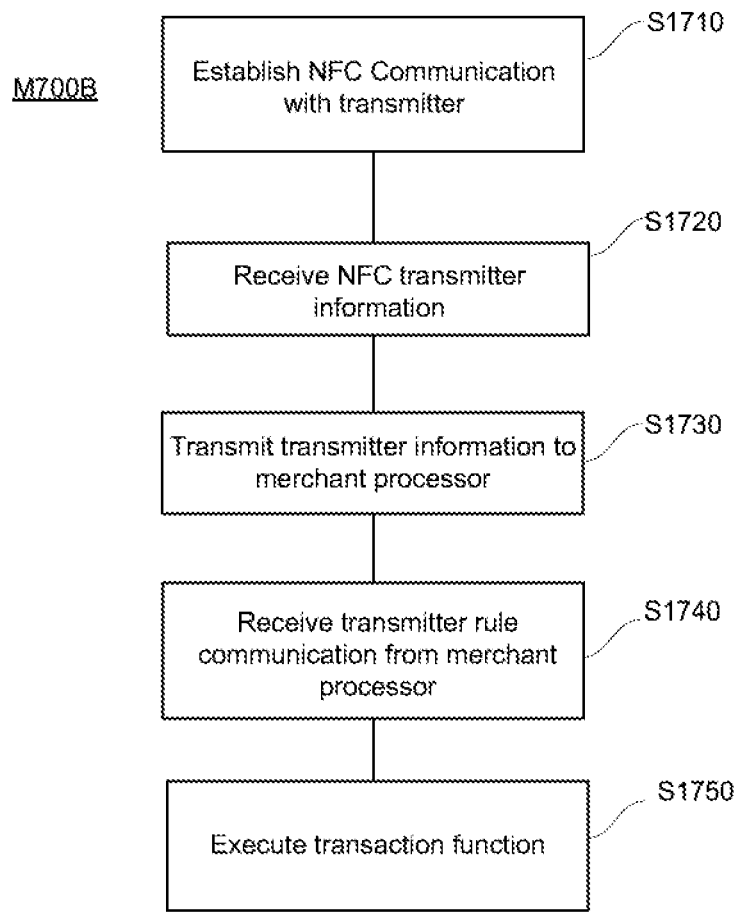
FIG. 7C is a flow diagram of a method of initiating a transaction function in a transaction processing device according to an embodiment of the invention.

FIG. 7C illustrates a method M700B of initiating a transaction function in a transaction processing device (e.g., a mobile interface device or other user device). At S1710 of method M700B, NFC communication is established between the transaction processing device and an NFC transmitter device. Typically, this will be accomplished by the user bringing the transaction processing device within NFC communication range of (or in contact with) the NFC device so as to trigger the NFC communication application on board the transaction processing device. At S1720, the transaction processing device receives information (referred to herein as "NFC information") from the NFC transmitter via the NFC communication. The received NFC information includes an identifier for the NFC transmitter device. In some embodiments, the NFC information includes authentication information in addition to the NFC transmitter device identifier. The authentication information may be or include encrypted information unique to the NFC device and the communication, which when decrypted by an authentication processor, serve to authenticate the NFC communication.

At S1730, the NFC information is transmitted by the transaction device to a merchant server configured for identifying the NFC device and determining a transaction function associated with the device. In some embodiments, the NFC information may comprise a network address that is used by the transaction device to establish an interactive communication session with the merchant server. At S1740, a rule communication from the merchant server is received by the transaction device. If a transaction function is associated with the NFC transmitter device, the rule communication may include instructions to execute the associated transaction function, whereupon the transaction device executes the transaction function at S1750. In some embodiments, the rule communication instructions request the user to confirm that the action is to be carried out prior to executing the transaction function.

If a transaction function is not associated with the NFC transmitter device, the rule communication may include a request to associate a function with the NFC transmitter device. The rule communication may further include an instruction to the transaction device to display a plurality of transaction functions to the user from which the user can select and enter a desired transaction function. The transaction device may transmit a response to the merchant server, the response including the user-selected transaction function to be associated with the NFC device. In some embodiments, this may be accomplished via an interactive exchange with the merchant server.

Some aspects of the present disclosure extend the RFID capability to allow customers, organizations, and/or merchants to tie mobile related actions within a user device. As non-limiting examples, a merchant could setup "dynamic promotions" so that users grab their devices and interact with the user (or the user RFID network); a user could setup a "re-order item" function for the RFID at home—tapping the RFID sticker with the user device would reorder the item; and an organization could setup "payment functions" associated with an RFID at a user's home (or rental)—tapping the RFID with the user device initiates the payment (e.g., rent payment, credit card payment, bank deposit, etc.).

While traditional private label merchant credit lines (e.g., merchant branded credit cards) are often maintained by third-parties, which can be expensive and have limited fraud detection/authorization check points that lead to unnecessary costs, certain aspects of the present disclosure relate to enhancement of RFID functionality addressing these and other issues.

Figure 8B:
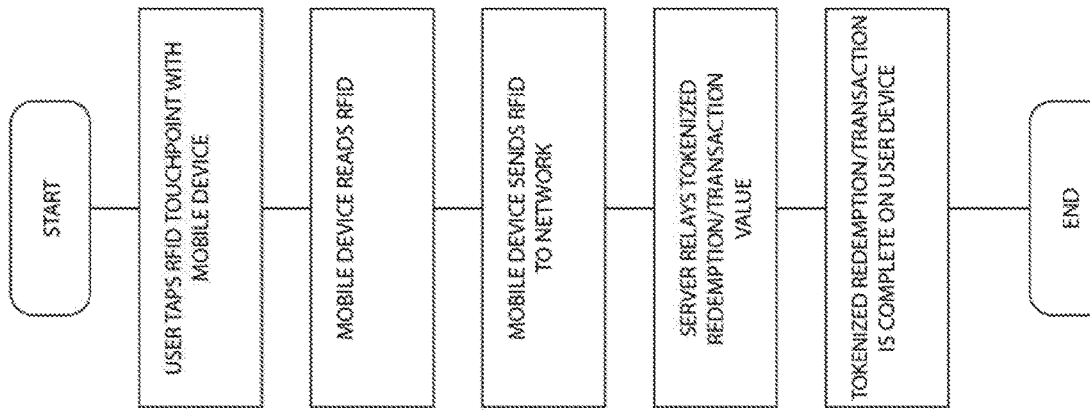
FIG. 8B is an example flowchart of a method of the present disclosure.
Figure 8A:
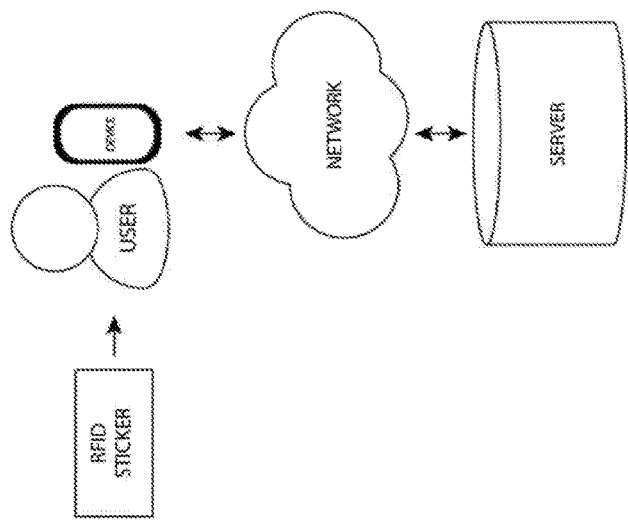
FIG. 8A illustrates a system environment for implementing certain aspects of the present disclosure.

FIG. 8A is a system environment for implementing certain aspects of the present disclosure. In the system environment of FIG. 8A, a user, a user device (e.g., user device 110 or a mobile device), an NFC device (e.g., an RFID sticker), a network (e.g., network 190), and a server (e.g., service provider terminal 120). The user may operate the user device to execute an RFID reader application, and the user may move the user device near the RFID sticker. The user device may read and send the RFID information to the server over the network. The server may redemption/transaction values to the user device, and transaction may be performed utilizing the user device as a POS device.

In some cases, a plurality of RFID stickers may be dispersed throughout a merchant location (e.g., a store). The RFID stickers may, for example, be linked to discount/promotional codes or values, and/or specific items. Accordingly, as a user shops, selected items and discounts may be added to a user's virtual checkout "cart." When a user scans a checkout RFID sticker (e.g., an RFID sticker at a designated checkout area), the scanning may trigger POS functionality of the user device. The user device may transmit the RFID information for the coupons and/or items to the server, and the server may inform the user device as to the transaction value. The user may then use the user device to finalize the transaction.

FIG. 8B is an example flowchart of a method of the present disclosure. The user places the user device near the RFID sticker (e.g., taps the RFID sticker). The user device reads and sends the RFID information to the server over the network. The server relays the tokenized redemption and/or transaction values to the user device based on the RFID information. The tokenized redemption/transaction is then completed on the user device. According to some aspects of the present disclosure, a user may access and utilize their merchant account at that particular merchant through their mobile device by tapping on an RFID-enabled checkout touchpoint. The touchpoint verifies the merchant location (i.e., is confirmed to belong to the merchant) and the transaction is processed within the user device. Accordingly, user/transaction authentication and merchant location remove the merchant's POS from the purchase flow and improve transaction security through enhancements to the user device and RFID functionality (e.g., providing multi-factor user authentication via the user device and merchant RFID).

Figure 9:
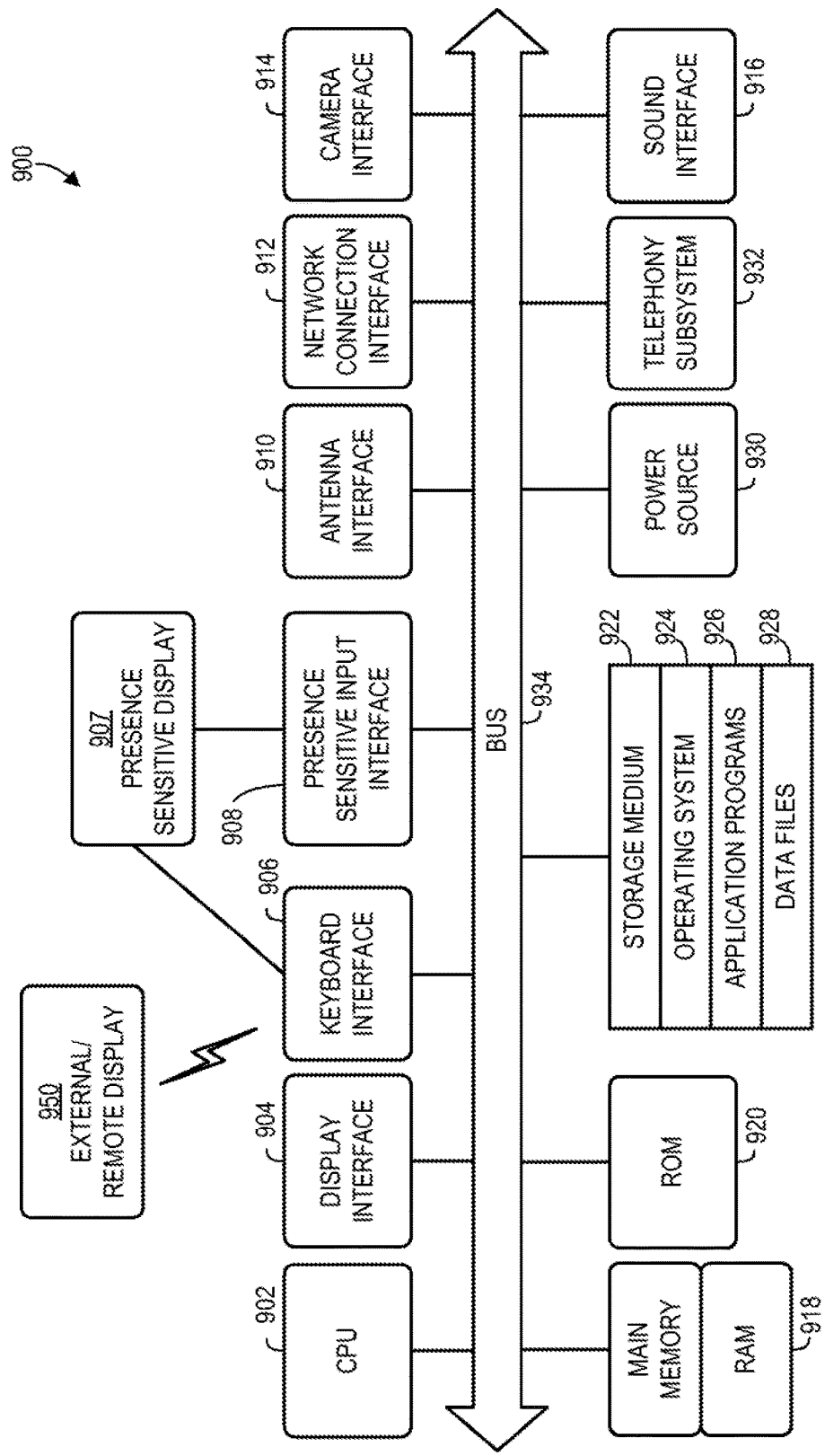
FIG. 9 is a computer architecture block diagram according to an example embodiment.

FIG. 9 is a block diagram of an illustrative computer system architecture 900, according to an example implementation. As non-limiting examples, one or more of user device 110, service provider terminal 120, service provider database system 130, merchant terminal 140, merchant database system 150, and beacon 170 may be implemented using one or more elements from the computer system architecture 900. It will be understood that the computing device architecture 900 is provided for example purposes only and does not limit the scope of the various implementations of the present disclosed systems, methods, and computer-readable mediums.

The computing device architecture 900 of FIG. 9 includes a central processing unit ((CPU) 902, where computer instructions are processed, and a display interface 904 that acts as a communication interface and provides functions for rendering video, graphics, images, and texts on the display. In certain example implementations of the disclosed technology, the display interface 904 may be directly connected to a local display, such as a touch-screen display associated with a mobile computing device. In another example implementation, the display interface 904 may be configured for providing data, images, and other information for an external/remote display 950 that is not necessarily physically connected to the mobile computing device. For example, a desktop monitor may be used for mirroring graphics and other information that is presented on a mobile computing device. In certain example implementations, the display interface 904 may wirelessly communicate, for example, via a Wi-Fi channel or other available network connection interface 912 to the external/remote display 950.

In an example implementation, the network connection interface 912 may be configured as a communication interface and may provide functions for rendering video, graphics, images, text, other information, or any combination thereof on the display. In one example, a communication interface may include a serial port, a parallel port, a general-purpose input and output (GPIO) port, a game port, a universal serial bus (USB), a micro-USB port, a high definition multimedia (HDMI) port, a video port, an audio port, a Bluetooth port, a near-field communication ((NFC) port, another like communication interface, or any combination thereof In one example, the display interface 904 may be operatively coupled to a local display, such as a touch-screen display associated with a mobile device. In another example, the display interface 904 may be configured to provide video, graphics, images, text, other information, or any combination thereof for an external/remote display 950 that is not necessarily connected to the mobile computing device. In one example, a desktop monitor may be used for mirroring or extending graphical information that may be presented on a mobile device. In another example, the display interface 904 may wirelessly communicate, for example, via the network connection interface 912 such as a Wi-Fi transceiver to the external/remote display 950.

The computing device architecture 900 may include a keyboard interface 906 that provides a communication interface to a keyboard. In one example implementation, the computing device architecture 900 may include a presence-sensitive display interface 908 for connecting to a presence-sensitive display 907. According to certain example implementations of the disclosed technology, the presence-sensitive display interface 908 may provide a communication interface to various devices such as a pointing device, a touch screen, a depth camera, etc. which may or may not be associated with a display.

The computing device architecture 900 may be configured to use an input device via one or more of input/output interfaces (for example, the keyboard interface 906, the display interface 904, the presence sensitive display interface 908, network connection interface 912, camera interface 914, sound interface 916, etc.) to allow a user to capture information into the computing device architecture 900. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 900 or may be a separate device. For example, the input device may be an accelerometer, a magnetometer, a digital camera, a microphone, and an optical sensor.

Example implementations of the computing device architecture 900 may include an antenna interface 910 that provides a communication interface to an antenna; a network connection interface 912 that provides a communication interface to a network. As mentioned above, the display interface 904 may be in communication with the network connection interface 912, for example, to provide information for display on a remote display that is not directly connected or attached to the system. In certain implementations, a camera interface 914 is provided that acts as a communication interface and provides functions for capturing digital images from a camera. In certain implementations, a sound interface 916 is provided as a communication interface for converting sound into electrical signals using a microphone and for converting electrical signals into sound using a speaker. According to example implementations, a random-access memory (RAM) 918 is provided, where computer instructions and data may be stored in a volatile memory device for processing by the CPU 902.

According to an example implementation, the computing device architecture 900 includes a read-only memory (ROM) 920 where invariant low-level system code or data for basic system functions such as basic input and output (I/O), startup, or reception of keystrokes from a keyboard are stored in a non-volatile memory device. According to an example implementation, the computing device architecture 900 includes a storage medium 922 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 924, application programs 926 (including, for example, a web browser application, a widget or gadget engine, and or other applications, as necessary) and data files 928 are stored. According to an example implementation, the computing device architecture 900 includes a power source 930 that provides an appropriate alternating current (AC) or direct current (DC) to power components.

According to an example implementation, the computing device architecture 900 includes a telephony subsystem 932 that allows the device 900 to transmit and receive sound over a telephone network. The constituent devices and the CPU 902 communicate with each other over a bus 934.

According to an example implementation, the CPU 902 has appropriate structure to be a computer processor. In one arrangement, the CPU 902 may include more than one processing unit. The RAM 918 interfaces with the computer bus 934 to provide quick RAM storage to the CPU 902 during the execution of software programs such as the operating system application programs, and device drivers. More specifically, the CPU 902 loads computer-executable process steps from the storage medium 922 or other media into a field of the RAM 918 to execute software programs. Data may be stored in the RAM 918, where the data may be accessed by the computer CPU 902 during execution.

The storage medium 922 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 922, which may include a machine-readable storage medium.

According to one example implementation, the term computing device, as used herein, may be a CPU, or conceptualized as a CPU (for example, the CPU 902 of FIG. 9). In this example implementation, the computing device (CPU) may be coupled, connected, and/or in communication with one or more peripheral devices, such as display. In another example implementation, the term computing device, as used herein, may refer to a mobile computing device such as a Smartphone, tablet computer, or smart watch. In this example implementation, the computing device may output content to its local display and/or speaker (s). In another example implementation, the computing device may output content to an external display device (e.g., over Wi-Fi) such as a TV or an external computing system.

In example implementations of the disclosed technology, a computing device may include any number of hardware and/or software applications that are executed to facilitate any of the operations. In example implementations, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be used to receive or collect data and/or user instructions from a wide variety of input devices. Received data may be processed by one or more computer processors as desired in various implementations of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of initiating a transaction function in a transaction processing device, the method comprising:
   establishing a first near field communication (NFC) between the transaction processing device and an NFC transmitting device having an associated tag identifier;
   receiving, by the transaction processing device from the NFC transmitting device, first NFC information including the tag identifier;
   transmitting the first NFC information by the transaction processing device to a merchant processor via a network;
   responsive to receiving the first NFC information by the merchant processor,
      transmitting, by the merchant processor to the transaction processing device, a first tag rule communication including an instruction to carry out a first transaction function associated with the tag identifier, and
      replacing, by the merchant processor in a rules database, the first transaction function with a second transaction function based solely on having received the first NFC information and having transmitted the instruction to carry out the first transaction function;
   receiving, by the transaction processing device from the merchant processor, the first tag rule communication;
   executing the first transaction function by the transaction processing device;
   establishing a second near field communication between the transaction processing device and the NFC transmitting device;
   receiving, by the transaction processing device from the NFC transmitting device, second NFC information including the tag identifier;
   transmitting the second NFC information by the transaction processing device to the merchant processor via a network;
   responsive to receiving the second NFC information by the merchant processor,
      transmitting, by the merchant processor to the transaction processing device, a second tag rule communication including an instruction to carry out the second transaction function; and
   receiving, by the transaction processing device from the merchant processor, the second tag rule communication.

2. A method according to claim 1 wherein the first and second NFC information each include a network address and the method further comprises:
   establishing a first interactive communication session with the merchant processor using the network address, the first interactive communication session comprising the actions of transmitting the first NFC information and receiving a first tag rule communication, and
   establishing a second interactive communication session with the merchant processor using the network address, the second interactive communication session comprising the actions of transmitting the second NFC information and receiving a second tag rule communication.

3. A method according to claim 2 wherein the first and second interactive communication sessions each further comprises:
   transmitting by the transaction processing device transaction security information.

4. A method according to claim 3 wherein the transaction security information includes at least one of the set consisting of
   encryption information received from the NFC transmitting device, and
   encrypted information encrypted using encryption information received from the NFC transmitting device.

5. A method according to claim 1 wherein the first and second NFC information each comprises authentication information unique to the NFC transmitting device and the respective first or second communication between the transaction processing device and the NFC transmitting device.

6. A method according to claim 5 wherein at least a portion of the authentication information is encrypted.

7. A method according to claim 1 wherein the first and second transaction functions are predetermined by the merchant processor.

8. A method according to claim 7 wherein the first and second transaction functions each comprise instructions for at least one of the set consisting of
   connecting to a web page using a web-browser on the transaction processing device, initiating a purchase transaction,
initiating a merchandise or service order,
adding to a pending merchandise or service order,
displaying information about a merchant service or product,
storing transaction processing information, and
activating or deactivating a remotely controlled device.

9. A method according to claim 1 further comprising
responsive to receiving an instruction to carry out one of the first and second transaction functions,
  displaying a request for a user of the transaction processing device to confirm that the transaction function should be carried out, and
  receiving a confirmation response from the user,
wherein the action of executing the first or second transaction function by the transaction processing device is conducted only upon receiving a positive confirmation response from the user.

10. An automated method of activating a transaction function in a transaction processing device, the method comprising:
  associating, by a merchant server in a rules database, a first transaction rule with a tag identifier associated with a near field communication (NFC) transmitting device, the first transaction rule specifying a first transaction function to be carried out upon a first interaction between a transaction processing device and the NFC transmitting device;
  receiving, by the merchant server from the transaction processing device over a network, first NFC information associated with first NFC communication between the NFC transmitting device and the transaction processing device;
  determining from the first NFC information, the tag identifier associated with the NFC transmitting device;
  retrieving, by the merchant server from the rules database, the first transaction rule associated with the tag identifier;
  transmitting, by the merchant server to the transaction processing device, an instruction to carry out the first transaction function;
  replacing by the merchant server in the rules database, the first transaction rule with a second transaction rule based solely on having received the first NFC information and having transmitted the instruction to carry out the first transaction function, the second transaction rule specifying a second transaction function;
  receiving, by the merchant server from the transaction processing device over a network, second NFC information associated with a second NFC communication between the NFC transmitting device and the transaction processing device;
  determining from the second NFC information, the tag identifier associated with the NFC transmitting device;
  retrieving, by the merchant server from the rules database, the second transaction rule; and
  transmitting, by the merchant server to the transaction processing device, an instruction to carry out the second transaction function.

11. An automated method according to claim 10 further comprising:
  replacing in the rules database, by the merchant server after transmitting the instruction to carry out the second transaction function, the second transaction rule with a third transaction rule, the third transaction rule specifying a third transaction function to be carried out upon a third interaction between the transaction processing device and the NFC transmitting device.

12. An automated method according to claim 10 wherein the rues database comprises a plurality of known tag identifiers and associated transaction rules.

13. A method according to claim 10 wherein at least a portion of each of the first and second NFC information is encrypted.

14. An automated method according to claim 10 wherein the first and second transaction functions each comprises instructions for at least one of the set consisting of
  connecting to a web page using a web-browser on the transaction processing device,
  initiating a purchase transaction,
  initiating a merchandise or service order,
  adding to a pending merchandise or service order,
  displaying information about a merchant service or product,
  storing transaction processing information, and
  activating or deactivating a remotely controlled device.

15. An automated method according to claim 10 further comprising:
  periodically changing the transaction rule associated with the tag identifier.

16. A transaction processing system comprising:
  a plurality of Near Field (NFC) transmitting devices, each having an associated tag identifier and configured to transmit NFC information comprising the tag identifier;
  a plurality of user interface devices each comprising
    a data processor,
    a user interface,
    a near field communication (NFC) interface,
    a memory accessible by the data processor, the memory having stored thereon a transaction application comprising instructions, which when executed by the data processor, cause the data processor to carry out transactions with transaction processing servers via a first network,
    an NFC application configured to establish communication between the data processor and the NFC transmitting devices via the NFC interface and to receive NFC information therefrom, and
    a transaction function association application comprising instructions to, upon establishment of communication with one of the NFC transmitting devices, transmit the received NFC information via a second network,
    receive a tag rule communication via the second network;
  an NFC rules database having stored therein a subset of the tag identifiers, each of the subset of tag identifiers having a transaction rule associated therewith, the transaction rule specifying a first transaction function to be carried out upon a first interaction between a particular user interface device and the NFC transmitting device associated with the tag identifier; and
  a merchant server in communication with the NFC rules database and, via the second network, the plurality of user interface devices, the merchant server being configured to
    receive NFC information from a requesting user interface device via the second network,
    determine from the NFC information, a tag identifier associated with an NFC transmitting device,
    determine if the tag identifier is one of the subset of the tag identifiers stored in the NFC rules database, responsive to a determination that the tag identifier is not one of the subset of the tag identifiers,
store, in the NFC rules database, the tag identifier and a new transaction rule,
responsive to a determination that the tag identifier is one of the subset of the tag identifiers,
retrieve the transaction rule associated with the tag identifier from the NFC rules database,
determine whether the first transaction function has previously been transmitted to the requesting user interface device,
responsive to a determination that the first transaction function has not previously been transmitted to the requesting user interface device,
transmit an instruction to the requesting user interface device to carry out the first transaction function associated with the tag identifier, and
responsive to a determination that the first transaction function has previously been transmitted to the requesting user interface device,
replace, in the transaction rule, the first transaction function with a second transaction function, and
transmit an instruction to the requesting user interface device to carry out the second transaction function.

\* \* \* \* \*